May 30, 1939.  E. G. CLEVELAND  2,160,307
RANDOM LENGTH BUNDLE TRIMMER
Filed Feb. 10, 1936   12 Sheets-Sheet 1

INVENTOR
Emmett George Cleveland
BY
*[signature]*
ATTORNEY

May 30, 1939.   E. G. CLEVELAND   2,160,307
RANDOM LENGTH BUNDLE TRIMMER
Filed Feb. 10, 1936   12 Sheets-Sheet 2

INVENTOR
*Emmett George Cleveland*
BY
ATTORNEY

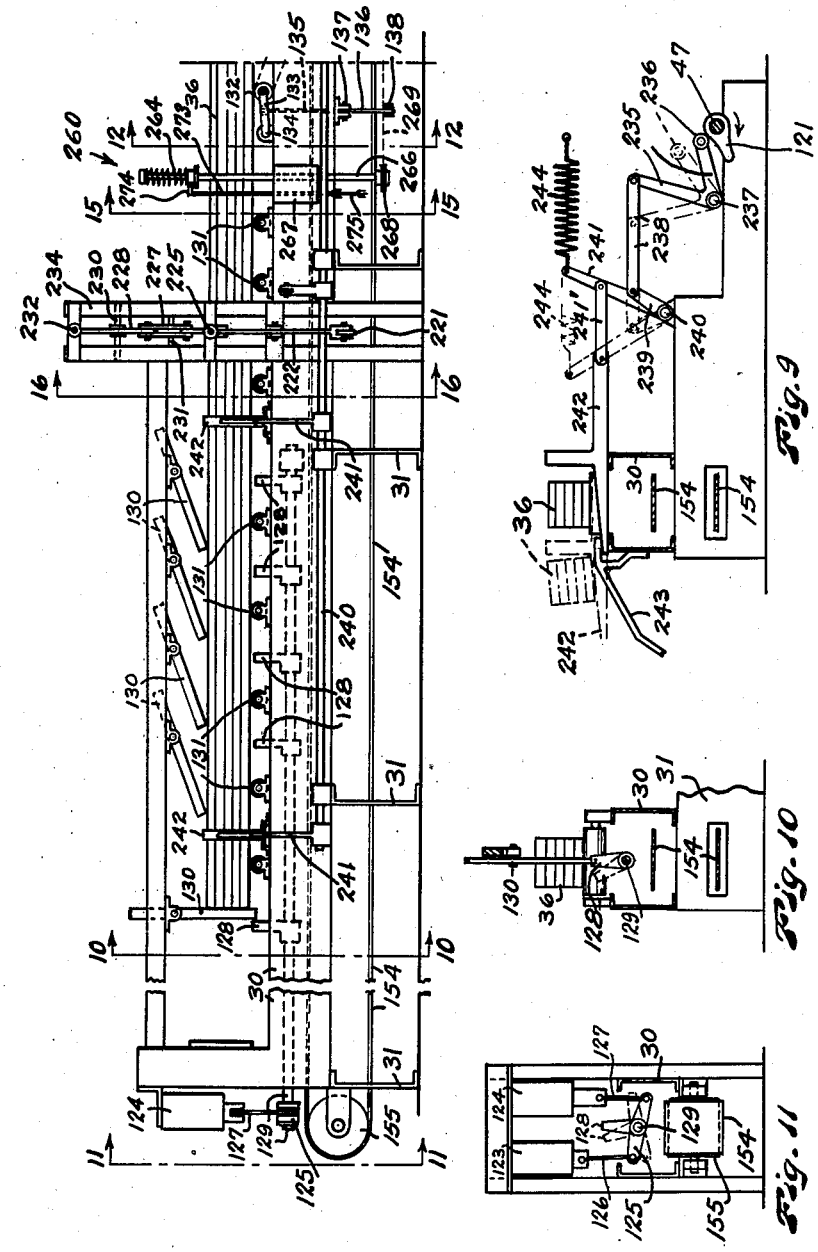

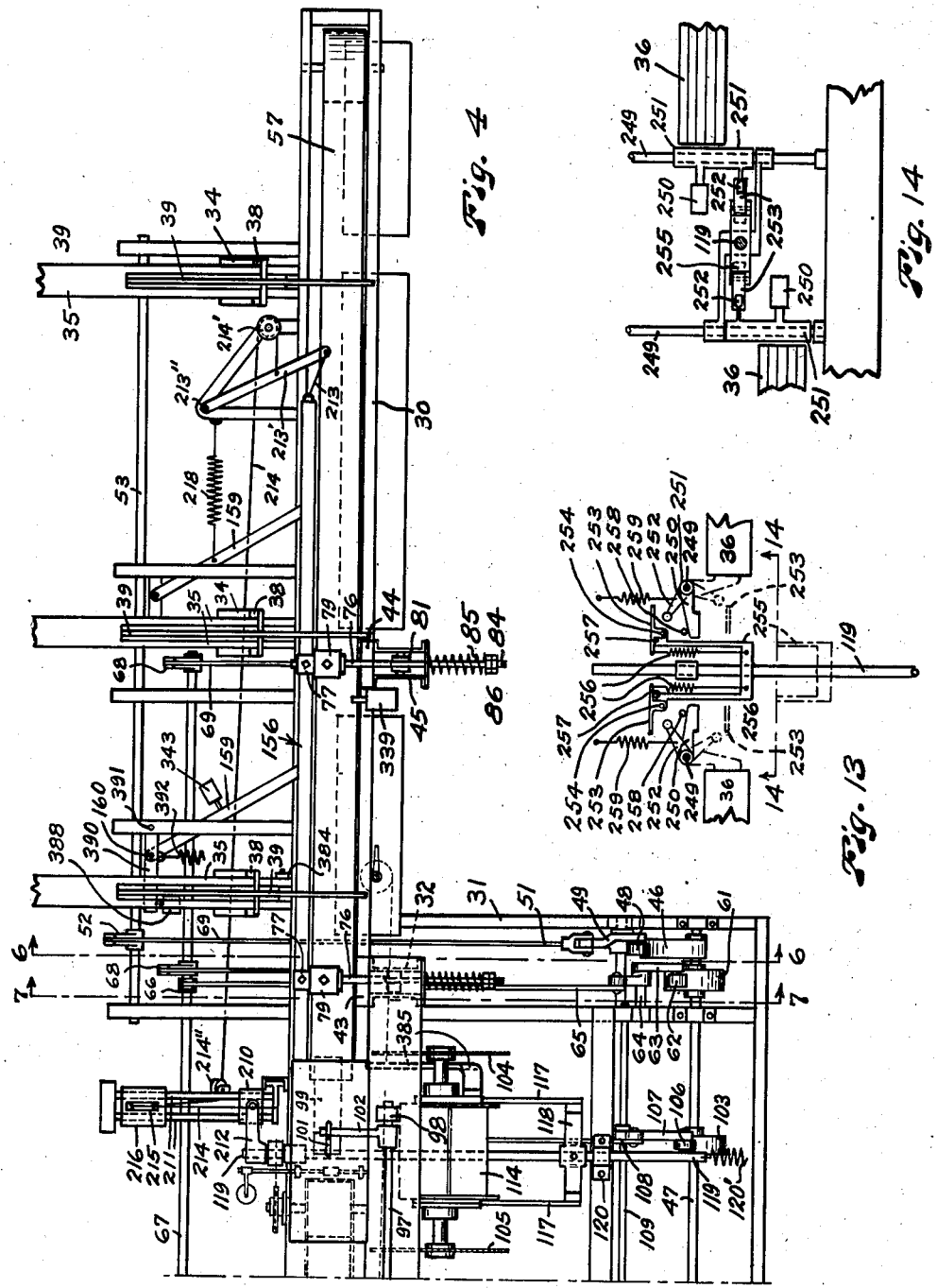

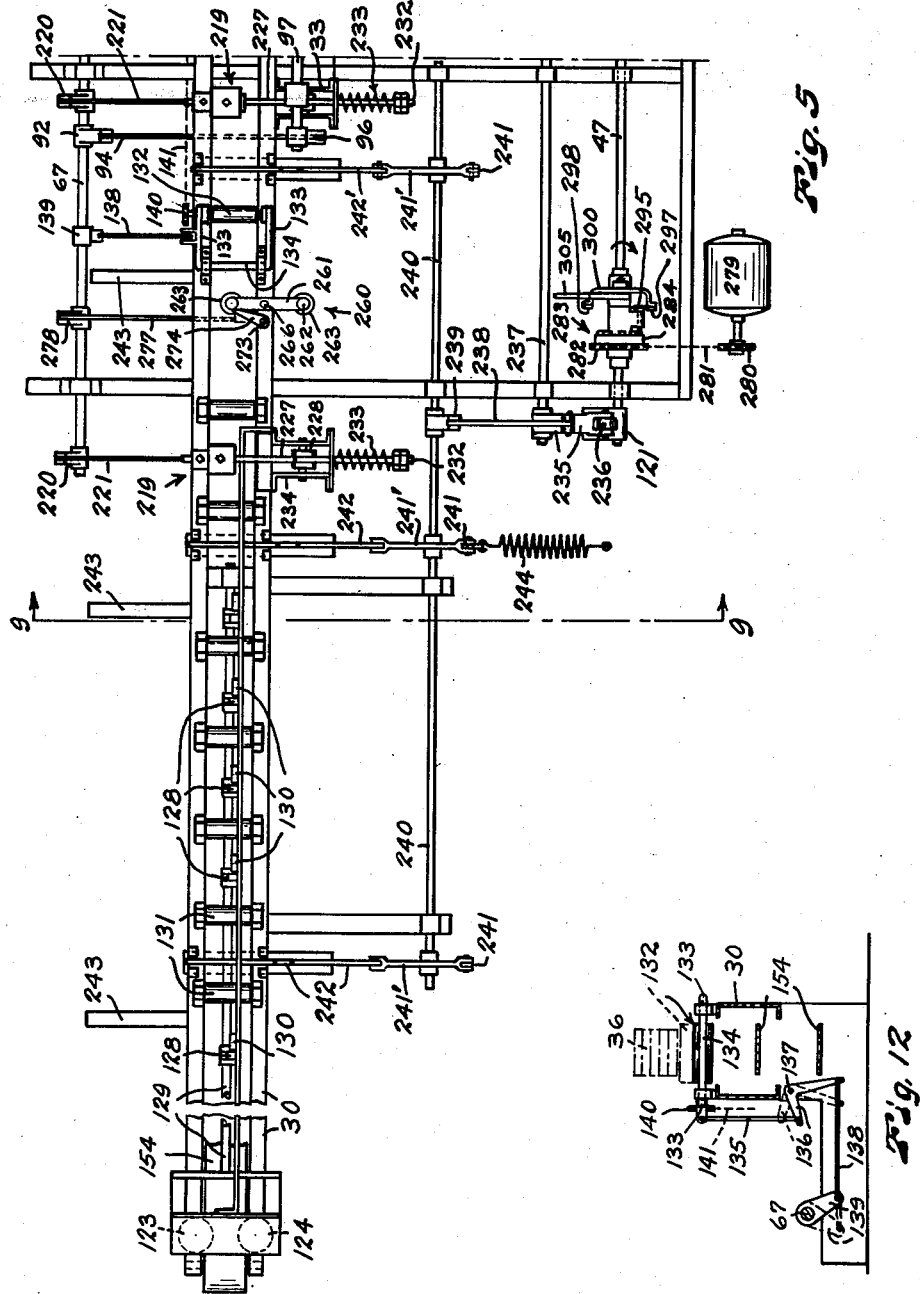

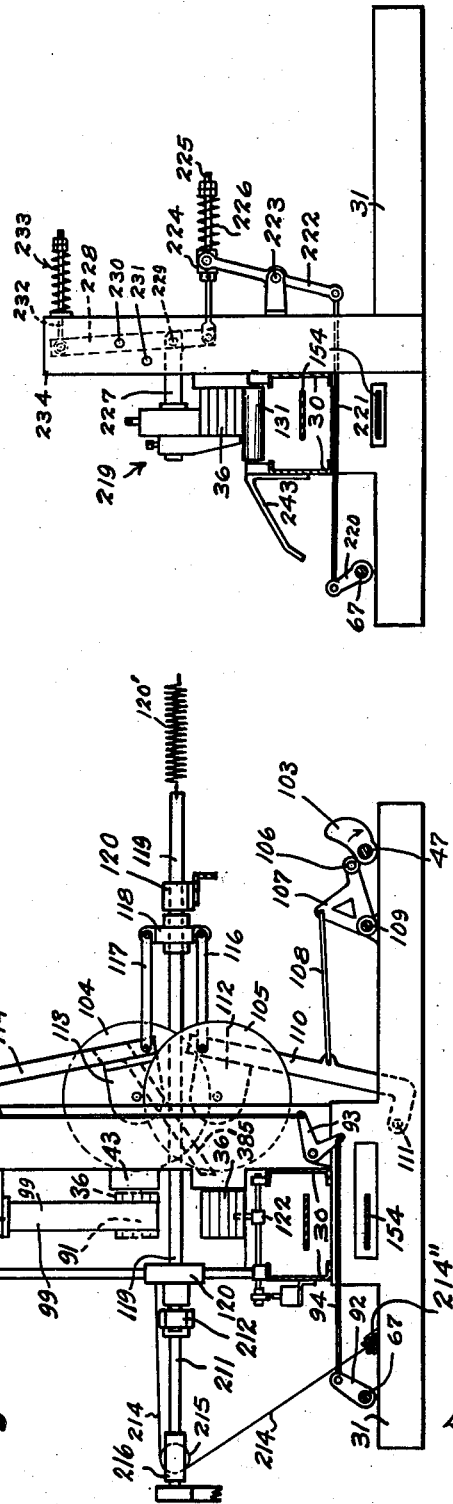

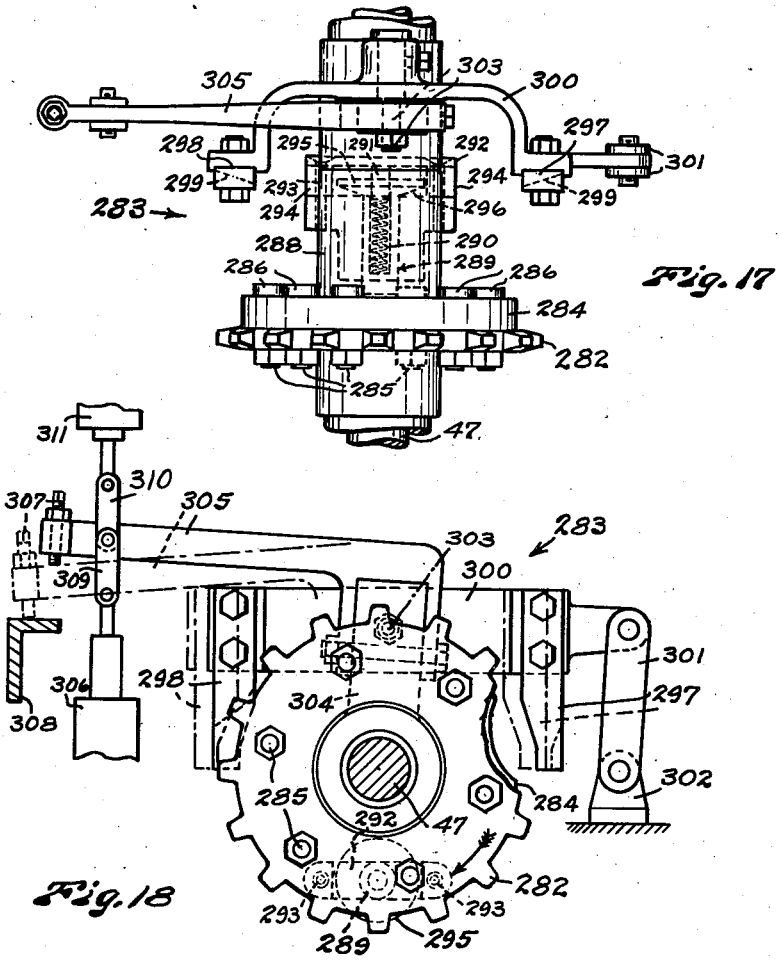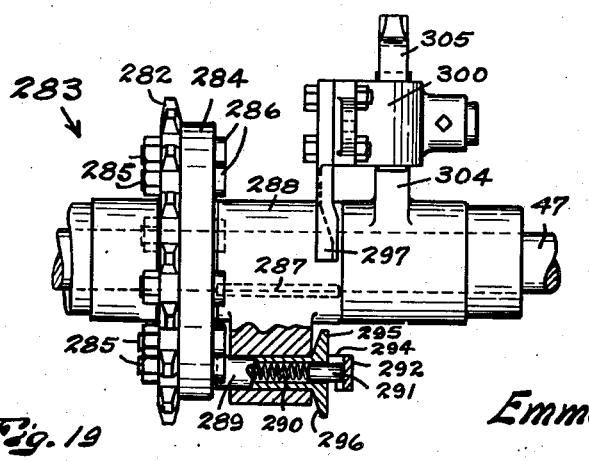

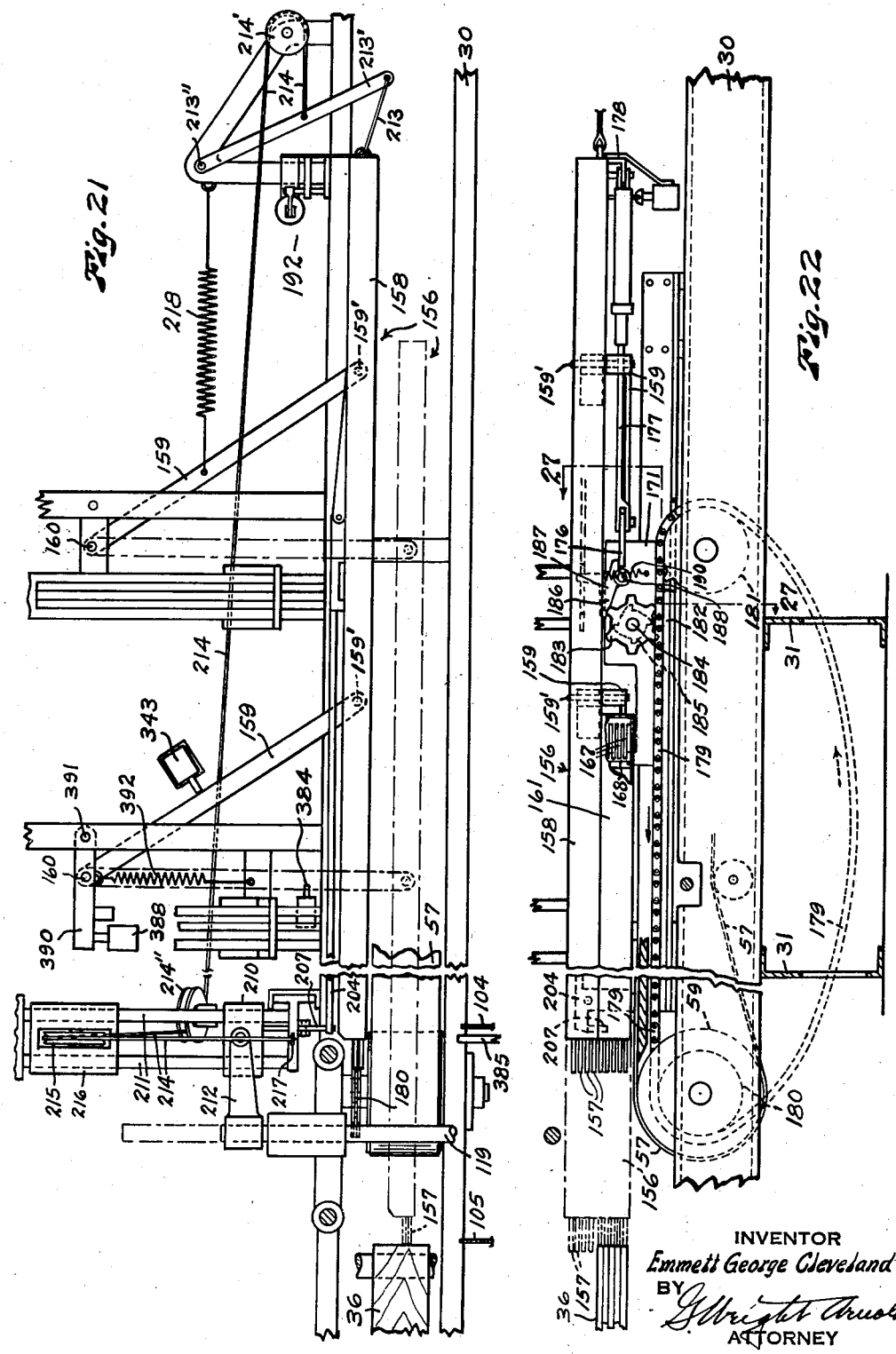

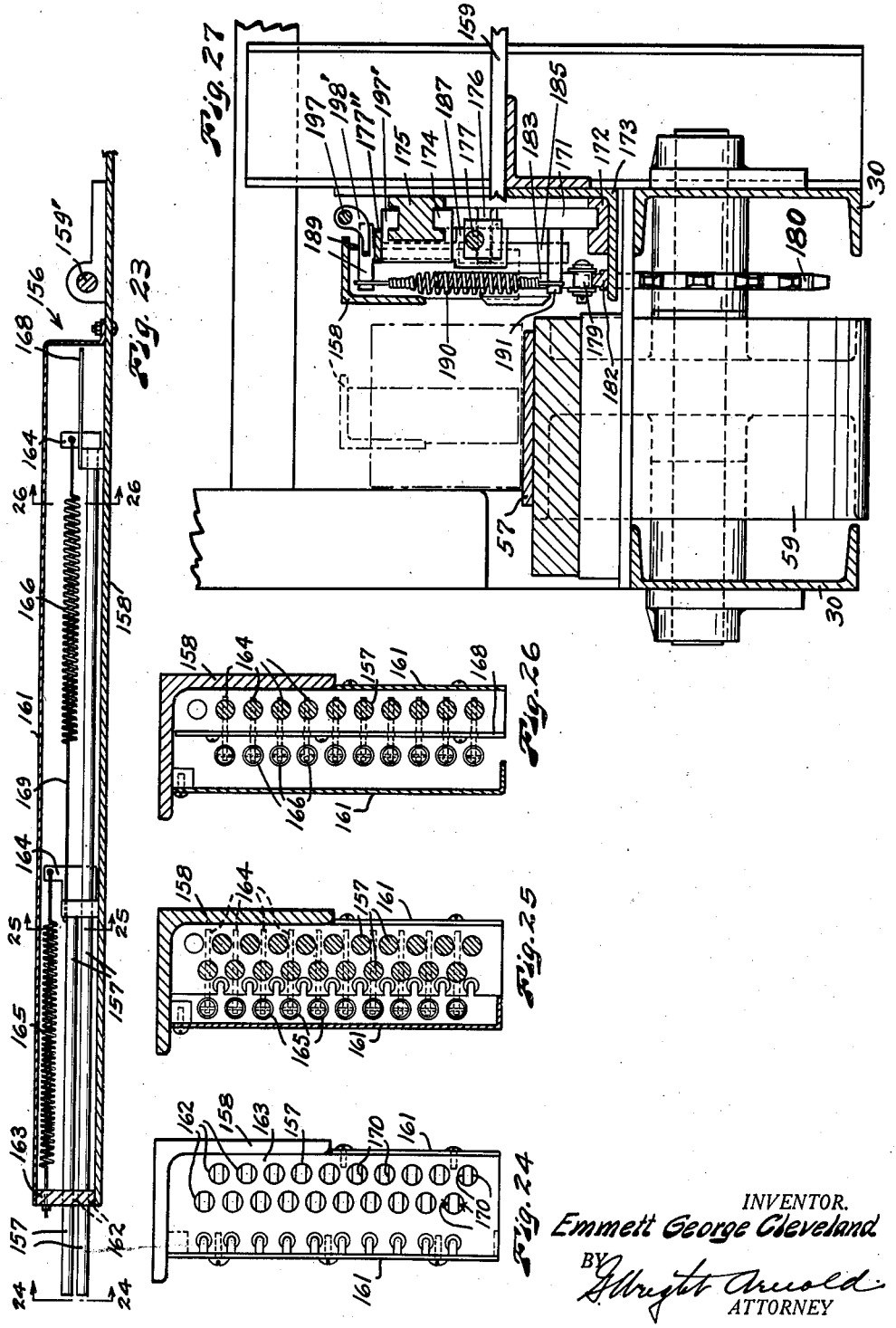

May 30, 1939.　　E. G. CLEVELAND　　2,160,307
RANDOM LENGTH BUNDLE TRIMMER
Filed Feb. 10, 1936　　12 Sheets-Sheet 11
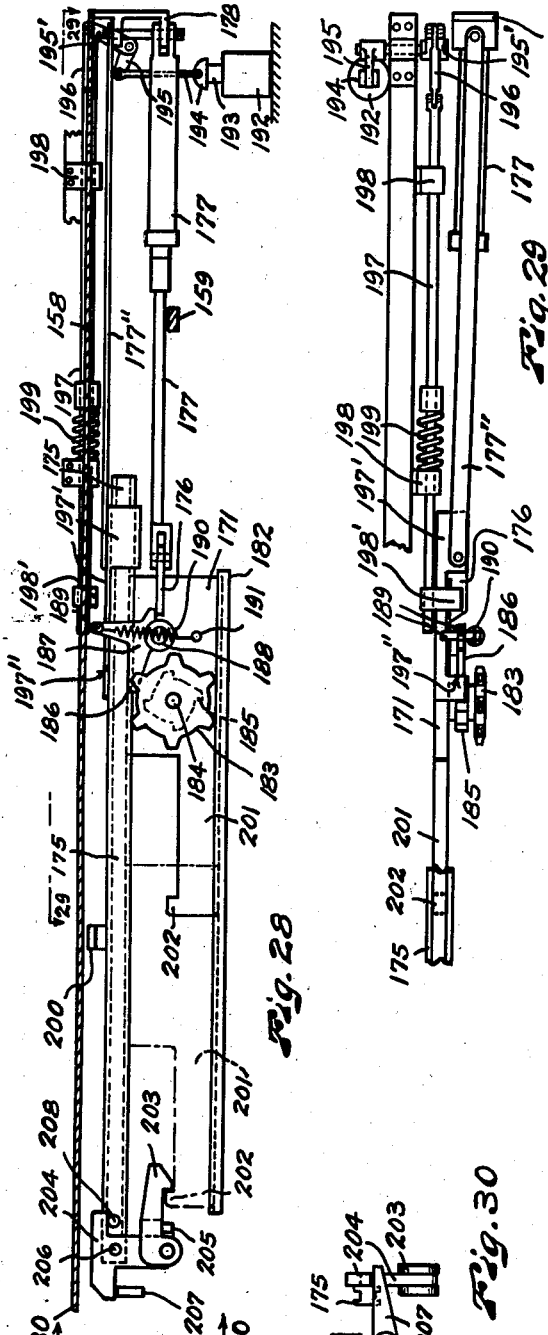
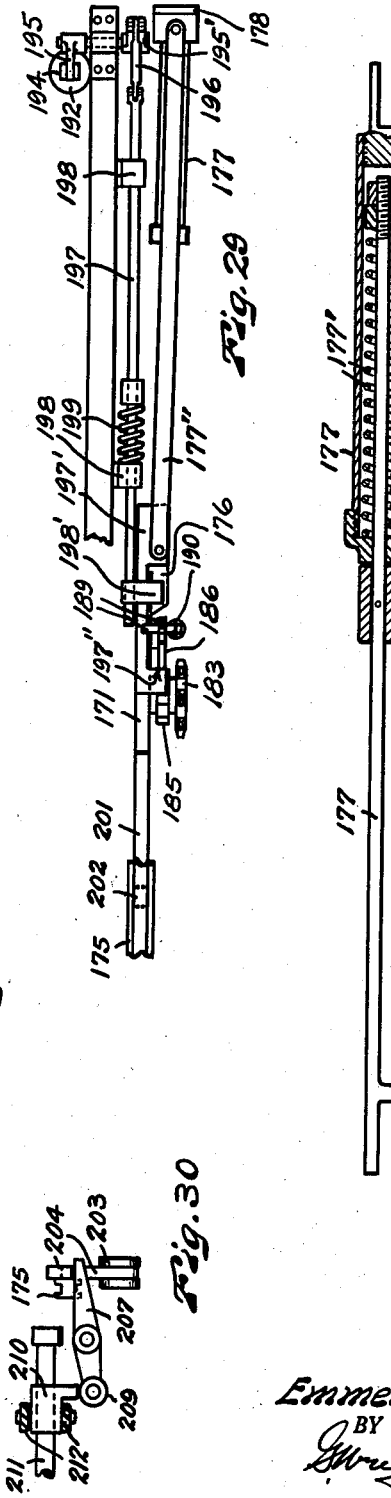
INVENTOR.
Emmett George Cleveland
BY
ATTORNEY Patented May 30, 1939

2,160,307

UNITED STATES PATENT OFFICE 2,160,307

RANDOM LENGTH BUNDLE TRIMMER

Emmett G. Cleveland, Raymond, Wash.

Application February 10, 1936, Serial No. 63,255

21 Claims. (Cl. 143—33)

This invention relates to machines for bundling, squaring and end trimming lumber to accurately measured lengths.

A primary object of the invention is to provide a machine which will securely clamp and hold random length bundles of lumber and which will smoothly and accurately end trim both ends of said bundles, and also trim the bundles to an accurate longitudinal dimension in a minimum length of time and with a minimum waste of lumber.

Another primary object of the invention is to provide a random length bundle trimming machine having means for supporting, clamping and holding a plurality of pieces of lumber in bundle form in a convenient position in which bundle securing means, as tie members, may be readily applied thereto and having means for smoothly and squarely trimming one end of said bundle at the same time that the bundle securing means or tie means is being applied, thus saving time and speeding up production by providing for the carrying out of two operations on the same bundle at the same time.

Another primary object of this invention is to smoothly and squarely trim one end of a bundle of lumber with a minimum waste. Another object is to utilize a single saw to smoothly and squarely trim the other ends of bundles, previously having one end squarely trimmed, so that the bundles will be of accurate measured lengths, even though random lengths of bundles are presented, and where the measured length of each individual bundle is determined by the rough length of the individual bundle. Particularly, it is an object to provide means for moving bundles of lumber longitudinally and across the path of movement of a movably mounted saw and to provide a plurality of stop means, each of which is controlled by a bundle of a particular length, thereby stopping a particular bundle in its longitudinal travel across the path of movement of a movably mounted saw in accordance with the rough length of the bundle, so that the maximum predetermined finished length of bundle is obtained from a given rough length bundle.

Another primary object of my invention is to provide a random length bundle trimming machine in which a bundle of lumber is very rapidly and conveniently moved out of the way after one end of the same has been smoothly and squarely trimmed and securing or tie means applied thereto, and to further provide means to rapidly move another bundle in place for such operation.

Another object is to provide a machine in which a bundle, which has been trimmed at one end, is moved longitudinally to another part of the machine, stopped and held in a position which is predetermined by the length of the bundle and in such position the other end of the bundle is smoothly and squarely trimmed so that the bundle will be of an accurately measured length. The trimming of the other or second end portion of the bundle is done while the first end of the next succeeding bundle is being trimmed and the securing or tie means applied thereto. Obviously more time will be required to move a bundle lengthwise far enough to get it out of the way of a succeeding bundle than will be required to move the bundle sidewise far enough to get it out of the way. This machine drops the bundle by gravity after the securing means has been applied and the first end trimmed, thus getting it out of the way very quickly and then moves the dropped bundle longitudinally to a new operative position during an interval of delay in which the next succeeding bundle is being brought in, positioned, and the tying operation started.

Another important object of the invention is to provide a random length bundle trimming machine requiring preferably the services of two operators to apply the securing or tie means to the bundles of lumber and in which the speed of the machine is carefully worked out and predetermined so as to substantially synchronize with the speed of the operators, whereby maximum efficiency is obtained. It is a further object to provide reliable and efficient joint control means for both operators so that the time permitted for the tying operation may be prolonged by either operator.

Another object of the invention is to provide a bundle trimming machine having control means adapted to stop the machine at the end of a predetermined cycle of operation after said machine has been started and further adapted to automatically stop the machine at an advanced or intermediate point in the cycle of operation. In the event that both operators have completed their tying operation and have released the automatic advanced stopping means, before the advanced stop position in the cycle is reached, then the machine will continue without interruption to the end of the cycle. In the event that both operators have not completed their securing or tying operation and released the advanced stopping means before said advanced point in the cycle of operation is reached, then the machine will be stopped in said advanced stop position.

Another object is to provide a bundle trimming machine having a pusher member or ram synchronized with the operation of the machine and provided with resiliently supported fingers arranged so that at least one finger will engage the trailing end of each piece of lumber in a bundle and thereby push the other ends of said pieces of lumber firmly against a stop, so that when the trailing end of the bundle is squarely trimmed, all of the pieces of lumber in the bundle will be of uniform length. It is also an object of this invention to provide pusher member retracting means, connected with the saw means by which the ends of the bundles are trimmed, which will positively retract the pusher member in response to the advance movement of the saws. It is a further object of the invention to provide safety means which will stop the machine in the event the pusher member is not properly retracted, and thus obviate all danger of contact between the saws and the pusher member. It is a further object of the invention to provide safety means which will prevent the sawing or end trimming of a bundle until after the pusher member has operated to properly position all of the pieces of lumber in the bundle.

Another object of the invention is to mount a driven circular saw so that the center of the saw will move substantially toward the center of a bundle of lumber, thereby trimming the bundle with a minimum length of stroke of the saw.

Other objects of the invention are to provide safety means which will prevent sawing of the bundle until the bundle is properly positioned; to provide means for preventing dead or non-rotating saws from being stroked; to provide bundle clamping means adapted to clamp and hold a bundle of lumber from two directions against a vertical support and a horizontal support while the ends of the bundle of lumber are being squarely trimmed; to provide printing or stamping means operable on the ends and on the sides of bundles of lumber; and to provide kick-off means for rapidly ejecting a bundle sidewise after it has been tied, trimmed and printed.

The above mentioned general objects of my invention, together with others inherent in the same, are attained by the mechanism illustrated in the following drawings, the same being preferred exemplary forms of embodiment of my invention, throughout which drawings like reference numerals indicate like parts:

Figs. 2 and 3 are side elevations on a larger scale than Figure 1, with parts omitted for purpose of clearness, showing the machine in two views; Fig. 2 showing substantially the bundle intake end portion; and Fig. 3 showing substantially the bundle discharge end portion of the machine, each of said figures showing a bundle of lumber in the machine;

Figs. 4 and 5 are plan views respectively substantially of the portions shown in Figs. 2 and 3, parts being omitted for the purpose of clearness and the bundles of lumber being omitted in these figures;

Fig. 8 is a view partly in cross section and partly in elevation substantially on broken line 8—8 of Fig. 4, illustrating especially the saw means and the stop means against which a bundle of lumber is urged preparatory to trimming the first end of said bundle, parts being omitted for the purpose of clearness;

Fig. 9 is a view partly in cross section and partly in elevation substantially on broken line 9—9 of Fig. 5, illustrating especially the mechanism for ejecting the bundles of lumber from the machine after the securing means has been applied and the bundles squarely trimmed on both ends to an accurately measured length; parts being omitted for the purpose of clearness;

Fig. 10 is a view partly in section and partly in elevation, substantially on broken line 10—10 of Fig. 3, illustrating especially parts of the stop means by which bundles of random or varying lengths are stopped in the correct positions, parts being omitted for the purpose of clearness;

Fig. 11 is an end elevation substantially on broken line 11—11 of Fig. 3, showing especially solenoid means used for positioning the stop means, parts being omitted for the purpose of clearness;

Fig. 12 is a fragmentary sectional view with parts in elevation, taken substantially on broken line 12—12 of Fig. 3, showing especially the driven roll elevating means;

Fig. 13 is a fragmentary detached plan view of means for printing or stamping the ends of the bundles of lumber;

Fig. 14 is a fragmentary elevation of said printing or stamping means, substantially on broken line 14—14 of Fig. 13;

Fig. 15 is a fragmentary detached elevation, with parts in section, substantially on broken line 15—15 of Fig. 3, showing especially a device for printing or marking the top side of a bundle of lumber;

Fig. 16 is a view partly in section and partly in elevation, substantially on broken line 16—16 of Fig. 3, showing especially a bundle clamping means on a different level than the bundle clamping means shown in Fig. 7, parts being omitted for the purpose of clearness;

Figs. 17, 18 and 19 are detached views on a larger scale showing the automatic clutch indicated generally by 283 in Fig. 5 and used in this bundle trimming machine for controlling the cycle of operation of the same, said clutch providing for a stop at the end of the cycle and also providing for an advanced stop during the cycle;

Fig. 20 is a cam diagram illustrating diagrammatically the operation of the cams during a cycle of operation of the machine;

Fig. 21 is a plan view of the pusher or ram mechanism with parts broken away and parts omitted;

Fig. 22 is a side elevation, with parts in section, of the pusher member or ram with parts broken away and parts omitted;

Fig. 23 is a detached longitudinal sectional view of the pusher or ram mechanism on a larger scale than Figs. 21 and 22, parts being shown in plan;

Fig. 24 is an end elevation of the pusher member, taken substantially on broken line 24—24 of Fig. 23, but on a larger scale than Fig. 23;

Figure 32:
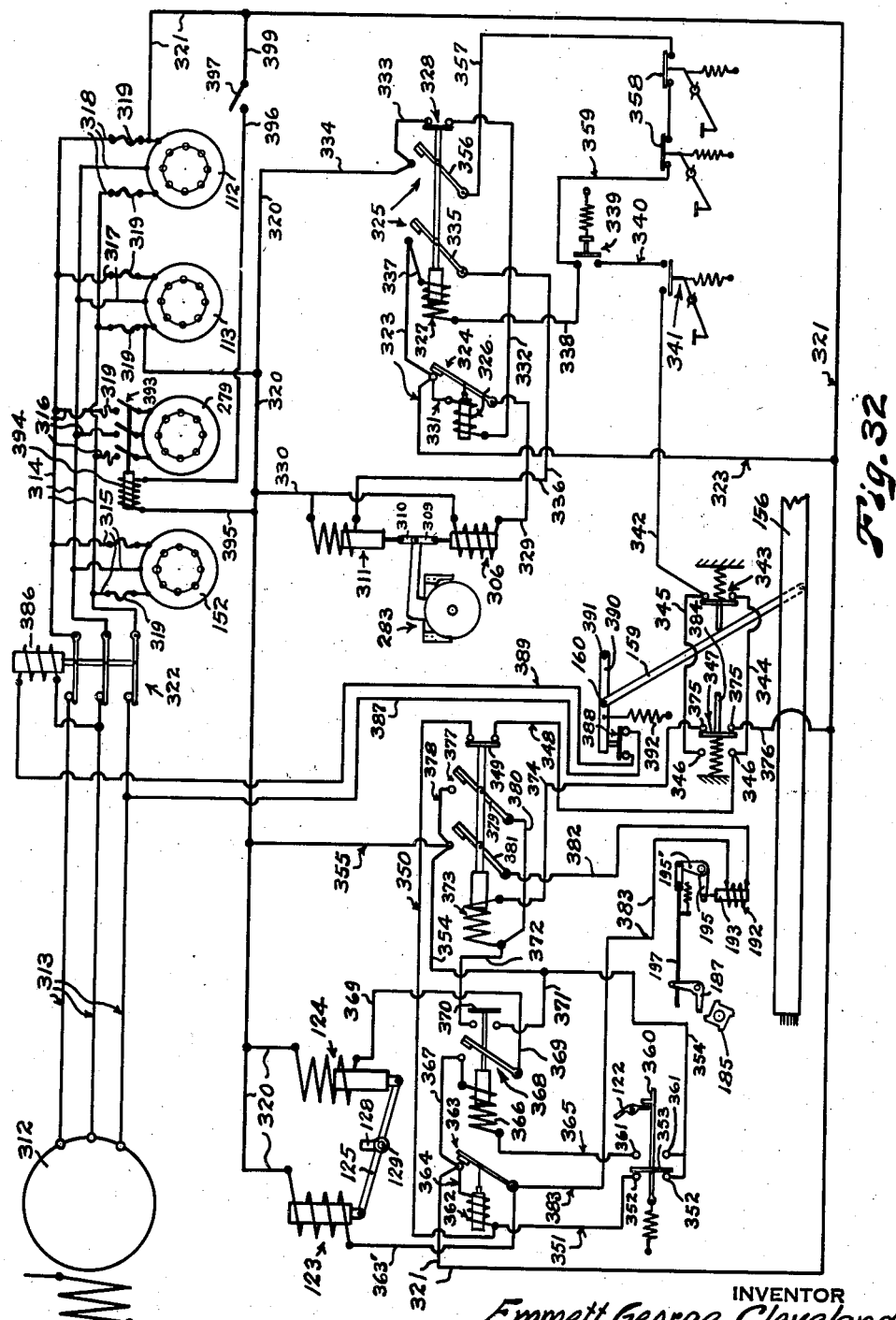

Figs. 25 and 26 are sectional views of the pusher member or ram, taken respectively on broken lines 25—25 and 26—26 of Fig. 23;

Fig. 27 is a sectional view substantially on broken line 27—27 of Fig. 22, parts being omitted and other parts shown in elevation;

Fig. 28 is a detached elevation illustrating mechanism for moving the pusher member or ram forwardly;

Fig. 29 is a detached plan view substantially on broken line 29—29 of Fig. 28 with the pusher member omitted;

Fig. 30 is an end view substantially on broken line 30—30 of Fig. 28, showing means for releasing a latch by which the pusher member or ram is held in a forward position;

Fig. 31 is a fragmentary detached sectional view of a portion of a resilient link means by which the pusher member or ram is connected with a movable slide;

Fig. 32 is a wiring diagram showing the electrical wiring of this device; and

Figure 33:
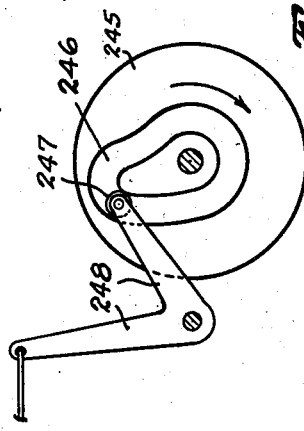

Fig. 33 is a view of an alternative type of double acting cam which may be embodied in this invention.

Lumber is generally cut to standard dimensions, such as substantially 6, 7, 8, 9, 10, 12, 14, etc., feet in length. As boards of substantially this length are travelling on the conveyor mechanism of the mill in the line of production, they are assorted and graded and formed into piles, such as for example, five pieces of uniform grade and of substantially equal length. The present invention is particularly applicable to facilitate tying and to squarely end trim such piles of boards. The boards in such piles have been only roughly cut to length. Generally the rough cut is a small amount over the desired length, such as six feet and two inches instead of six feet. This machine is particularly adapted to directly receive these piles of lumber from the conveyor mechanism in the line of production and provides means to clamp these piles of lumber so that they may be tied and formed into bundles, and accurately, squarely and smoothly trimmed on both ends with cutting tools, while the bundles are securely held at the proper angle to the cutting tool. The various piles which are delivered in the line of production are not of uniform length, and a pile of boards of one length, such as six feet, may be followed by a pile of boards of another length, such as fourteen feet. This machine is adapted to squarely, smoothly and accurately end trim such random length piles of boards.

Referring to the drawings, the main frame of this machine preferably comprises two relatively long, longitudinally disposed, spaced apart, parallel channel bars 30 supported on shorter transverse channel bars 31 which may be of variable length and which, in some instances, project sidewise beyond the longitudinal bars 30 to form supports for other parts of the machine.

Figure 1:
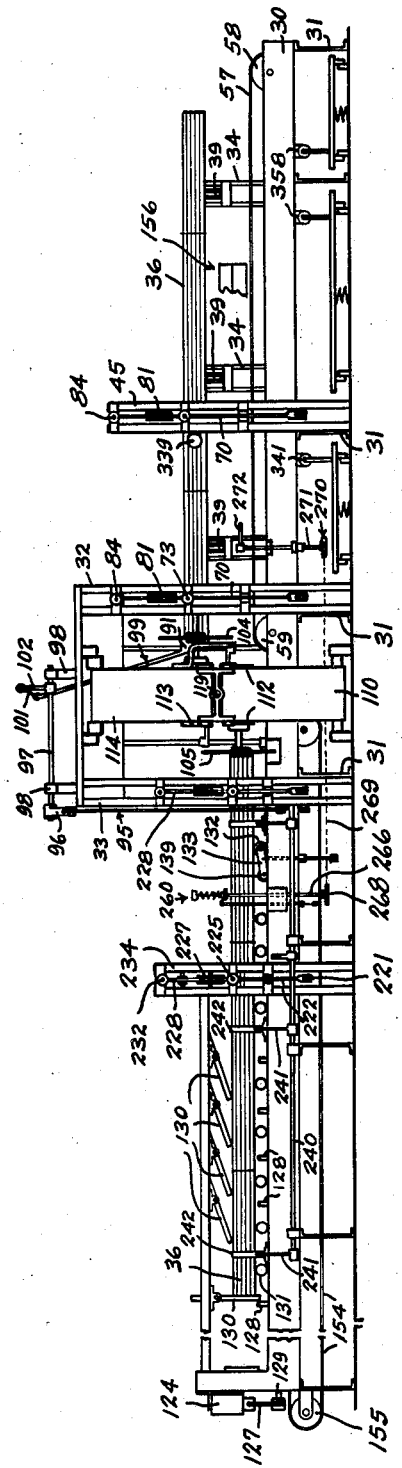
Figure 1 is a side elevation of a bundle trimming machine constructed in accordance with my invention, taken from the side of the machine on which the operators stand, with parts omitted for the purpose of clearness.

Approximately midway of the length of the machine two spaced apart upright supports 32 and 33 are provided. Each of these upright supports 32 and 33 is preferably formed of two spaced apart members which may have their lower end portions secured to the longitudinal and transverse channel bars 30 and 31. The end portion of the machine shown at the right of the upright supports 32 and 33, see Figs. 1, 2 and 4, is hereinafter termed the bundle intake portion, and the end portion shown at the left of said upright supports, see Figs. 1, 3 and 5, is hereinafter termed the bundle discharge portion.

A plurality of longitudinally spaced apart upright supports 34 (see Fig. 6) are provided at the bundle intake portion of the machine on the opposite side of the longitudinal frame members 30 from the upright supports 32 and 33. These supports 34 have horizontal lumber supporting members 35 on the upper ends thereof on which piles 36 of lumber to be end trimmed and tied may rest. These piles of lumber are commonly bound by tying them manually with flexible tie members, such as twine or cable, but they may be bound in various other well known ways, and the references herein contained to the tying of these bundles are intended only as illustrative of the binding of the bundle by tying or by any other well known or suitable means.

Figure 6:
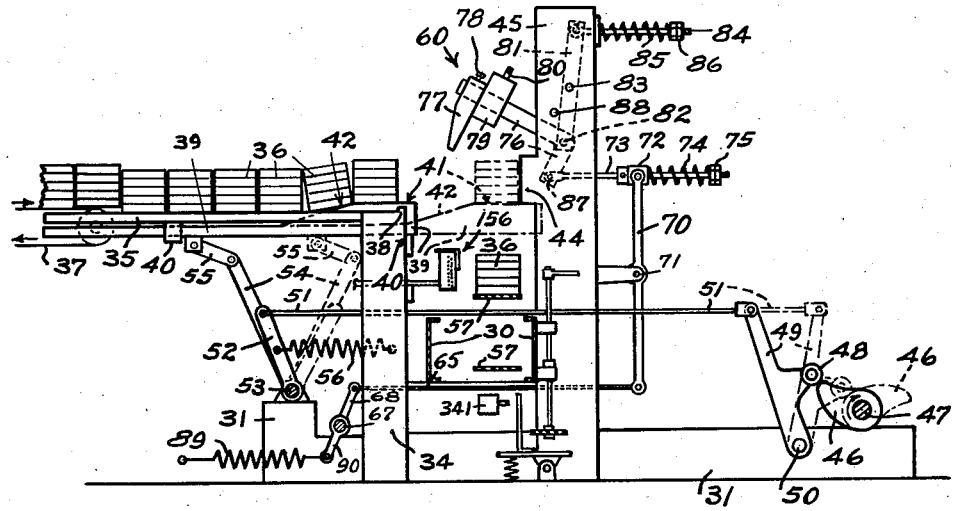
Fig. 6 is a view partly in cross section and partly in elevation substantially on broken line 6—6 of Fig. 4, illustrating particularly the drawbar mechanism and driving means therefor, parts being omitted for the purpose of clearness.

The piles of lumber 36 may be delivered to the lumber supporting members 35 in any suitable way, as for instance by endless belt type conveyors 37, see Fig. 6, which will keep the piles of lumber 36 pushed against stops 38. The endless belt type conveyor belt 37 may be the conveyor means usually employed in the line of production in the mill.

Figure 7:
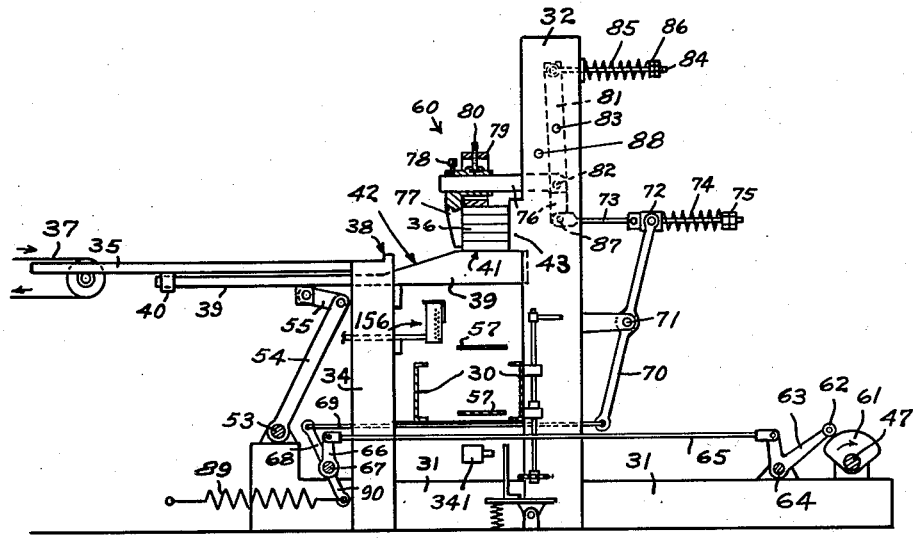
Fig. 7 is a view partly in cross section and partly in elevation substantially on broken line 7—7 of Fig. 4, illustrating particularly the bundle clamping means and operating devices for the same, parts being omitted and parts being partially broken away for purpose of clearness.

Drawbars 39, Figs. 6 and 7, are slidably mounted for horizontal movement in bearings 40 on the supports 34 and 35. These drawbars 39 each have raised portions 41 providing horizontal lumber supports on their forward end portions and have inclined upper edge portions 42 extending to the raised portions 41. The upper edges of the rear portions of the drawbars 39 are below the plane of the top surfaces of the horizontal supports 35 and the raised portions 41 at the forward ends of said drawbars are above the plane of the tops of the stops 38. The drawbars are adapted to be moved horizontally between the position shown by dot and dash lines and the position shown by full lines in Fig. 6. As said drawbars are moved from the forward position shown by dot and dash lines into the retracted position shown by full lines in Fig. 6, they will drop any bundle which rests on the forward raised portions 41 thereof. At the same time the inclined portions 42 of said drawbars will move under and elevate the foremost pile of lumber on the supports 35 clear of the stops 38. As the drawbars move back to the dot and dash line position shown in Fig. 6, they will tend to carry the first of the piles of lumber 36 with them into a position where it may be clamped and held for tying and end trimming. In high speed operation it may be necessary for the operators to assist the drawbars 39 in bringing in the piles of lumber 36, because of slippage between the draw bars 39 and the piles of lumber 36. The pile of lumber 36 thus carried into position is placed against positioning means 43 on the upright support 32 and against similar positioning means 44 on another upright support 45. Preferably the operators place their hands on the pile of lumber on the drawbars and guide said bundle as it drops onto a transfer belt 57 in response to retraction of the drawbars. The positioning means 43 and 44 are in alignment and accurately position the bundle which is supported on the drawbars 39. A plurality of the drawbars 39 are preferably provided. The drawings show three of said drawbars.

These drawbars 39, see Figs. 4 and 6, are reciprocably moved horizontally by means of a cam 46 on a cam shaft 47. The cam 46 engages with a roller 48 on a lever 49 fulcrumed on a pivot 50. One end of lever 49 is connected by link 51 with an upright lever arm 52, which arm 52 is secured to a rockshaft 53 mounted on the channel bar 31, see Fig. 6. The rockshaft 53 is provided with fixedly connected upright levers 54, one at the location of each drawbar 39, and said levers 54 are connected with the respective drawbars 39 by links 55. In the event that a single acting cam, as shown in Fig. 6, is used, then resilient or yielding means as a spring 56 is provided for moving the drawbars in one direction and maintaining the roller 48 in contact with the cam 46. This spring is shown in Fig. 6 as connected to lever arm 52, but may be connected with other operative parts of the drawbar mechanism. When cam 46 is rotated, lever 49 will be moved angularly and drawbars 39 will be moved longitudinally in an obvious manner to bring in and drop bundles.

Preferably the spring 56 moves the drawbars 39 towards the upright supports 32 and 45 to bring in the piles of lumber and said drawbars are retracted by the cam 46. This is desirable as a safety feature and may prevent damage in the event of accidental contact between the drawbars 39 and a bundle which has been delayed in dropping.

The rotation of the cam shaft 47 is determined by means of the clutch mechanism illustrated in Figs. 5, 17, 18 and 19, and the operation thereof will be discussed hereinafter in connection with said clutch mechanism.

When the drawbars are in the position indicated by full lines in Fig. 6, and the machine is in operation, a bundle 36 is supported on the drawbars in a raised position above and clear of the stops 38. When the drawbars are moved horizontally into the position indicated by dot and dash lines in Fig. 6, the bundle is in position for the tying, clamping and trimming which will be hereinafter discussed. After the bundle has been clamped, tied, and one end trimmed, the draw bars 39 are moved horizontally to the full line position shown in Fig. 6, and the bundle on the drawbars is dropped on a travelling endless transfer belt 57. Then the drawbars 39 go under and support the next bundle of lumber. It is to be noted that when the drawbars move out from under and permit a bundle to drop to the transfer belt 57, that the bundle is very rapidly moved out of the way by dropping, whereby a minimum period of time is used in accomplishing this operation. Therefore, a new bundle of lumber may be very quickly brought into position for the next clamping, tying and end trimming operation, permitting extremely rapid operation. Endless transfer belt 57 is supported on rolls 58 and 59.

When the drawbars 39 are in the dot and dash line position shown in Fig. 6, with a bundle supported thereon, it is necessary to clamp the bundle against the positioning means 43 and 44, so that one end may be squarely, smoothly and accurately trimmed. Preferably two clamps 60 are provided for firmly clamping the bundle of lumber horizontally against the positioning means 43 and 44, as well as vertically against the drawbars 39. The operating mechanism of these clamps 60 may be as follows: A clamp cam 61 (Fig. 7) is fixedly secured to the rotating cam shaft 47. A roller 62 is supported for engagement against the clamp cam 61 by means of a bell crank 63 which is fulcrumed on pivot 64. A link 65 connects lever arm 66 with the bell crank 63. The lever arms 66 and 68 are rigidly secured to a rockshaft 67. Links 69 connect between lever arms 68 and lever arms 70. Lever arms 70 are mounted on pivots 71, and each of said lever arms 70 is preferably resiliently connected with clamp 60 by means of a sleeve 72 slidably mounted on a link 73 and a compression spring means 74 interposed between the sleeve 72 and a nut 75 mounted on the link 73. Each of the clamping means 60 comprises a bell crank shaped arm 76 having mounted thereon a side or horizontal pressure member 77, which member 77 is adjustably secured to the outer end portion of the bell crank shaped arm 76 as by a set screw 78. Such set screw 78 may be loosened and the side or horizontal pressure member 77 moved longitudinally as respects the outer end portion of the arm 76. This permits the horizontal or side pressure member 77 to be adjusted to accommodate different widths of bundles of lumber. A vertical pressure member 79 is preferably adjustably connected with the arm 76 and may be vertically adjusted to accommodate different heights of bundles of lumber. As indicated by the sectional view in Fig. 7, the set screw 80 may be turned to provide vertical adjustment of the vertical pressure member 79. A lever arm 81 has one end portion pivotally connected with the bell crank shaped arm 76 as by a pivot 82. This lever arm 81 is pivotally connected intermediate its length to the upright support 32 as by a pivot 83. The other end of the lever arm 81 is resiliently connected to the upright support 32 as by link 84 having a compression spring 85 interposed between the upright support 32 and a nut 86 on the link 84. The lower end portions of the bell crank shaped arms 76 are pivotally connected to links 73 as by pivots 87. A stop member 88 limits the pivotal movement of the lever arm 81 in one direction. In the event that the single operating cam 61, illustrated in Fig. 7, is used, a spring member 89 is provided urging the roller 62 against the clamp cam 61. This spring member 89 may be in the form of a tension spring connected by a lever 90 with the rockshaft 67.

In the operation of the clamp members 60, the horizontal pressure member 77 and the vertical pressure member 79 are first adjusted to accommodate the size of bundle to be operated upon. As the cam shaft 47 is rotated, the clamp cam 61 will rotate, causing the roller 62 and the parts connected therewith to move in accordance with the shape of the cam. The movement of the roller 62 is transferred through the various bell cranks and links and levers, so that the links 73 are reciprocated. The pull on the links 73, when the clamping means 60 are in the position indicated in Fig. 7, tends to cause the bell crank shaped arms 76 to move angularly on the pivots 82 and urge the vertical pressure members 79 downwardly against the bundle of lumber supported on drawbars 39. As the pull is continued on the links 73, the lever arms 81 will be moved angularly on the pivots 83 and the horizontal pressure members 77 will be urged against the side of the bundle, firmly securing the bundle against positioning means 43 and 44. In providing a resilient connection between the links 73 and the lever arms 70, I have provided a resilient pressure for the vertical pressure member 79 and the horizontal pressure member 77. Furthermore, I have provided a connection which will permit considerable movement of the lever arms 70 and a lesser movement of the bell crank shaped member 76, the amount of movement of the bell crank shaped member 76 being determined by the amount necessary for the vertical pressure member 79 and the horizontal pressure member 77 to engage the bundle of lumber.

By providing horizontal pressure means I cause each board of lumber of the bundle to be securely held against the positioning means 43 and 44. Likewise by providing vertical pressure means on the top of the bundle, I have provided means to securely hold the bundle against vertical displacement.

After a bundle of lumber has been drawn into the machine on the drawbars, a point corresponding to the end of one cycle of operation and the starting of the next cycle of operation is reached. The operators then move the bundle longitudinally sufficiently for the ends of all of the boards in the bundle to firmly engage a stop member 91, see Figs. 2 and 8. The operators, by control means hereinafter discussed, cause the cam shaft 47 to rotate and the operation of this cam shaft, at this point in the cycle, starts the operation of the clamps 60. Then the bundle is clamped, as hereinbefore discussed, the stop member 91 is retracted, the bundle is tied by the operators and the end of the bundle of lumber, which was positioned against the stop member 91, is squarely trimmed.

The means for retracting the stop member 91 is illustrated in Fig. 8. The operation of the rockshaft 67 was discussed in connection with the movement of the clamp cam 61. On this same rockshaft 67 is fixedly secured a lever 92. A bell crank 93 is connected by a link 94 with the lever 92. A link 95 connects a lever 96 with the bell crank 93. This lever 96 is fixedly secured to a rockshaft 97 suitably mounted in bearings 98 (see Fig. 2). The stop member 91 has a perpendicular face against which the ends of the boards of the bundle may be aligned. This stop member 91 is fixedly connected to an angularly positioned arm 99 which is slidably mounted in suitable bearings 100. The angularly positioned arm 99 slides upwardly at an angle through the bearings 100 and to the left as respects the showing in Fig. 2. A link 101 connects the lever arm 102, which lever arm is rigidly secured on rockshaft 97, with an end portion of angularly positioned arm 99. The link member 101, being connected by universal pivot means with lever 102 and arm 99, respectively, compensates for the angular movement of the angularly positioned arm 99 and also compensates for the arcuate movement of the lever arm 102. When the clamp rockshaft 67 is turned and the clamps engage the bundle, the rockshaft 97 through its links and levers is moved angularly and the stop member 91 is moved upwardly from the full line position shown in Fig. 2 to the dot and dash line position shown in Fig. 2.

As the cam shaft 47 rotates, the clamps 60 are moved to engage the bundle, the stop member 91 is moved upwardly, the saw cam 103 is moved and the forward stroke of the saws 104 and 105 is started. Referring to Fig. 8, the saw cam 103 is mounted on cam shaft 47. Roller 106 rides against cam 103. Bell crank 107 supports roller 106 on one arm and is pivotally connected at the other arm to link 108. This bell crank 107 is fulcrumed on pivot 109. Link 108 pivotally connects with lower saw frame 110. Lower saw frame 110 is supported by pivot 111. The saw 105 and driving means therefor, such as an electric motor 112 are carried by lower saw frame 110. Saw 104 and driving means therefor, such as an electric motor 113, are carried by upper saw frame 114 which is supported by pivot means 115. Lower saw frame 110 and upper saw frame 114 are interconnected for common swinging movement by means of links 116 and 117, which are pivoted to the saw frames at one end and have their other ends pivoted to yoke 118. Yoke 118 is supported on a transverse shaft 119. This shaft is mounted in suitable bearings 120. In the event that the single acting cam indicated in Fig. 8 is used, a tension spring 120' is provided to maintain engagement between the roller 106 and the saw cam 103 through the links and levers shown. Preferably the saws 104 and 105 are so mounted that, in the stroking of the saws, the centers of the saws move substantially towards the centers of the bundles, thereby providing a minimum length of stroke, as will be clearly apparent from Fig. 3 of the drawings.

Referring to Figure 20, which is the cam diagram, it will be noted that the saw cam commences to stroke the saw frames 110 and 114 gradually as the clamps are applied. However, the shape of this cam is such that no actual sawing is accomplished until after the clamps have been securely applied. After the bundle of lumber has been clamped, the operators apply the tie, and at the same time saw 104 trims an end of the bundle of lumber which they are tying. The cycle of operation continues and after the end of this bundle is trimmed, the saws are returned and the clamps are released. At this position the advanced stop position in the cycle is reached, and further operation of the machine requires a positive action on the part of the operators to continue for the remainder of the cycle. This control on the part of the operators will be discussed hereinafter. The bundle of lumber is now ready to be dropped onto the endless transfer belt 57 and another bundle is to be brought into the machine on the drawbars.

The operation of the clamps 60 is controlled by the rotation of the cam shaft 47 through the clamp cam 61 thereon. Also the swinging operation of the saws is controlled by the rotation of the cam shaft 47 through the saw cam 103. In controlling the operation of this machine, the operators, by controls hereinafter discussed, start the operation of the cam shaft 47, and this cam shaft turns for approximately 230° of its cycle and reaches the advanced stop position. By the control means hereinafter discussed, if the cam shaft 47 has stopped in the advanced stop position, the operators may again commence the rotation of the cam shaft 47 and thereby cause the operation of the drawbar cam 46 and the kick-off cam 121. The drawbar cam 46 and the kick-off cam 121 are mounted on the cam shaft 47.

After the operation of the drawbar cam 46 resulting in movement of the drawbars 39 to the full line position shown in Fig. 6, which has been heretofore discussed, the bundle, which has been tied and has had one end thereof trimmed, is permitted to drop onto the endless transfer belt 57 and the next bundle is moved on the drawbars into place for tying, trimming, etc. The bundle which has been tied and has had one end trimmed is carried by the transfer belt 57 in a direction to the left as considered in Figs. 1, 2 and 3. In its travel, this bundle first passes over a trigger member 122 and depresses the same. Trigger member 122 operates electrical switches and through means, discussed hereinafter in connection with the wiring diagram, sets stop means responsive to the particular length of the bundle which passes over said trigger. Furthermore, the depressing of trigger member 122, as a safety feature, prevents the operators from rotating cam shaft 47. Referring to the stop means, see Fig. 11, when a bundle is on the trigger member 122, solenoid 124 is energized and solenoid 123 is de-energized. When no bundle is on trigger member 122, then solenoid 124 is de-energized and solenoid 123 is energized. Lever 125 is connected by links 126 and 127 with the plungers of solenoids 123 and 124, respectively. Energizing of solenoid 124 and de-energizing of solenoid 123 angularly moves the lever 125 in a counterclockwise direction and angularly moves the stops 128 from the position shown in full lines to the position shown by dot and dash lines in Fig. 11, and thereby releases the stop bars 130. Energizing of solenoid 123, and de-energizing of solenoid 124 angularly moves the lever 125 in a clockwise direction and angularly moves the stops 128 from the position shown by dot and dash lines in Fig. 11 to the position shown by full lines in Fig. 11, and thereby positions the stops 128 in the paths of the stop bars 130.

Referring to Fig. 3, the stops 128 are rigidly secured on a shaft 129, which shaft is rigidly secured to lever 125. Depending stop bars 130 are pivotally mounted at their upper ends and have their lower ends operatively positioned as respects stops 128. In the event that stops 128 are vertical, the depending stop bars 130 cannot be moved past the stops 128, while if the stops 128 are angularly moved from the vertical position shown in full lines in Fig. 10 to the position shown by dot and dash lines in Fig. 10, it will be seen that the depending stop bars 130 may be swung past the stops 128 as they are lifted by a bundle of lumber 36. After a bundle of lumber 36 has depressed trigger member 122, it will continue to pass under and raise successive depending stop bars 130 until the trailing end of the bundle of lumber passes off of and releases trigger member 122. As soon as the trailing end of the bundle of lumber passes off of and releases trigger member 122, then solenoid 123 is energized and solenoid 124 is de-energized and the stop member 128 is angularly moved to the full line position shown in Figs. 10 and 11 and the remaining depending stop bars 130, which have not yet been raised by reason of the bundle 36 of lumber passing thereunder, cannot be raised and the bundle of lumber 36 will be stopped, abutting against the next depending stop bar 130.

After the bundle of lumber is delivered from the transfer belt 57, it is supported by a plurality of rolls 131, Fig. 3. It is not necessary that these rolls be driven, as the travelling bundle has sufficient momentum to travel until it is stopped by one of the depending stop bars 130. Preferably, a driven roll 132, Figs. 3, 5 and 12, is used to crowd the bundle 36 against a depending stop bar 130 and compensate for any rebound resulting from the impact of the bundle against a stop bar 130. The driven roll 132 is preferably positioned in advance of the first depending stop bar 130 so that regardless of the length of the bundle, the driven roll will be operative. The driven roll 132 preferably has means to elevate it to a somewhat higher elevation than the rolls 131 to insure engagement between this driven roll and the bundle 36. This elevating means elevates driven roll 132 during the time of the transfer of the bundle along the rolls 130. At the time the bundle is clamped on the rolls 131 for trimming the remaining end of the bundle, the driven roll 132 is lowered so that it is lower in elevation than the rolls 131.

The raising and lowering of roll 132 is accomplished by mechanism best shown in Figs. 3, 5, and 12. This driven roll 132 is rotatably mounted in a U shaped bracket member having two side arms 133 rigid with a transverse pivotally mounted end portion 134. One of the side arms 133 is connected by link means 135 with one end of a bell crank lever 136 which is fulcrumed on a pivot 137. The other end of bell crank lever 136 is connected by a link 138 with a lever 139 on the clamp rockshaft 67. While the bundle is coming onto the rolls 131 and 132, and previous to the clamping of said bundle, the driven roll 132 is maintained at a higher elevation than the rolls 131, and forms the support for the bundle, as indicated by dot and dash lines in Fig. 12. By movement of the clamp rockshaft 67 immediately before said bundle is clamped, the driven roll 132 is moved downwardly clear of the bundle 36, as shown by full lines in Fig. 12. The driving means for driven roll 132 may be a sprocket wheel 140 on the shaft of said driven roll 132, which sprocket wheel 140 is connected by link belt 141 with sprocket wheel 142 on a shaft 143, see Fig. 2. Shaft 143 is provided with another sprocket wheel 144 which is connected by a link belt 145 with a sprocket wheel 146 on the shaft 147 which carries the roller 59 on which the transfer belt 57 is mounted. The shaft 147 is driven by a link belt 148 passing around a sprocket wheel 149 on said shaft 147 and connected with a sprocket wheel 150 on the shaft 151 of an electric motor 152. This electric motor 152 is driven continuously while the machine is in operation. The shaft 143 also has a roller 153 mounted thereon which carries an endless traveling refuse discharge belt 154. The outer end of the discharge belt 154 is mounted on a roller 155, see Fig. 3, and this discharge belt is positioned below the saw 105 to receive the sawdust, chips and the like therefrom. As the trimmings from the leading end of the bundle are very thin, they may drop on the floor and be removed at intervals.

The bundle 36 passing along the rolls 131 has had one end squarely trimmed. In order to squarely trim the remaining end of this bundle and to provide a common length to all of the boards of the bundle, it is necessary that the end, which has been previously trimmed, be positively held longitudinally against a stop member with the ends of all of the boards in the bundle exactly flush against the stop member and that the bundle be clamped.

As a plurality of boards are contained within the bundle, it is necessary that said boards individually be urged against one of the depending stop bars 130 to positively straighten up the bundle. I provide a pusher member or ram 156, Figs. 4 and 21 to 31 inclusive, with a plurality of fingers 157, each finger having a relatively small engaging end, and the finger being so positioned that at least one finger 157 will engage each board without overlapping and engaging another board, irrespective of the particular size of the boards in a bundle. After the bundle has passed over the trigger member 122, the trigger member is released. The release of this trigger member at this point energizes means controlling and causing the pusher member to move forwardly, so that the fingers 157 properly push the individual boards of the bundle longitudinally. The energizing of the pusher member will be discussed hereinafter in connection with the wiring diagram. The pusher member is positioned at one side of the machine alongside of the transfer belt 57, and at the side of the path of movement of the bundle of lumber which is being transferred from the belt 57 to the rolls 131. This pusher member is thus out of the way of the bundle of lumber, while said bundle is being transferred. This pusher member comprises a main frame portion 158 which is supported by two link members 159. The link members 159 each have one end pivotally connected by pivot means 159' with the pusher frame 158 and the other or outer end pivotally mounted for swinging movement on pivots 160, which are further discussed hereinafter in connection with Fig. 32. When the pusher member is in the retracted or inoperative position, these link members 159 are positioned at an angle relative to the pusher frame 158 as shown by full lines in Fig. 21. As said pusher frame is moved forwardly, these link members 159 assume a position more nearly at right angles to the pusher frame and move said pusher frame inwardly across the transfer belt 57 into a position in alignment with and behind the trailing end of the bundle of lumber which has just been transferred, see dot and dash line position Fig. 21. The links 159 thus provide a supporting and mounting means for the pusher frame 158 and further provide a means, as said pusher frame is urged longitudinally, for moving said pusher frame transversely to get said pusher frame out of the line of travel of a bundle of lumber, or to properly position it behind a bundle of lumber.

The fingers 157 are slidably mounted for longitudinal movement within a housing 161 at the forward end of the pusher frame 158. Two sets of these fingers 157 are preferably provided, viz., a longer set of fingers and a shorter set of fingers as shown in Fig. 23. These fingers are guided in suitable openings 162 in a plate 163 at the forward end of the housing 161, and the forward ends of these fingers project beyond the end of the housing 161. The rear end portions of the pusher fingers are provided with bracket means 164 which extend outwardly and are secured to tension springs 165 and 166. The bracket means 164, to which the springs 166 are secured, are preferably positioned in slots 167, see Figs. 22 and 23, in a plate 168, and are thereby guided to prevent angular or turning movement of the fingers with which they are connected. Turning movement of the shorter fingers is prevented by allowing the bracket members 164, which are connected with the springs 165, to extend between the longer fingers 157, as shown in Figs. 23 and 25. The forward ends of the fingers 157 are preferably flattened on the top and bottom sides, respectively, as shown at 170 in Fig. 24, so that each finger may be caused to engage with the end of only one board. The fingers 157 are positioned in relatively close relation in two vertical rows with the fingers in one row offset as respects the fingers in the other row, so that when the pusher member is moved against the rear or trailing end of a bundle of lumber, at least one of said resiliently supported pusher fingers will engage with the rear end of each board or piece of lumber in said bundle without overlapping other boards. This provides an individual pressure on the rear end portion of each piece of lumber to push the same forwardly against a stop bar 130, positioned at the forward end of the bundle. This insures that the forward ends of all of the pieces of lumber in the bundle will be exactly flush when the clamps are applied, thus insuring that when the rear end portion of the bundle is trimmed, all of the pieces of lumber in the bundle will be of exactly the same length.

The means for moving the pusher member longitudinally is in the nature of a slide or cross head 171, Figs. 22, 27, 28 and 29, slidably disposed within a trackway 172 on an angle support 173. The upper edge of the slide 171 is guided in a groove 174 of a guide element 175 which is fixedly connected with the angle support 173. The rear end of the slide 171 is provided with a fixed bracket member 176, to which the forward end of a connecting rod means 177 is pivotally secured. The rear end of connecting rod means 177 is pivotally connected, through intermediate resilient mechanism hereinafter described, with a bracket 178 on the rear end of the main frame portion 158 of the pusher member. The connecting rod means 177 and intermediate mechanism thus forms a link connection between the slide member 171 and the frame 158, whereby the frame 158 may be moved by movement of the slide member 171. The slide member 171 is arranged to be moved by an endless travelling link belt 179 which is carried on sprocket wheels 180 and 181. One lap of this link belt 179 is arranged to ride upon a track member 182 in the angle support 173, and is further arranged to engage with the teeth of a sprocket wheel 183 which is rotatably mounted on a fixed bearing 184 on the slide member 171. The teeth of the sprocket wheel 183 are substantially tangent with the surface of the track member 182. If the sprocket wheel 183 is allowed to idle or rotate freely, it is obvious that movement of the link belt 179 will rotate said sprocket wheel without moving the slide 171. However, if the sprocket wheel 183 is locked or restrained from rotary movement, then the link belt 179 will move the slide 171 along with it. Means for locking the sprocket wheel 183 against rotation is provided in the nature of a ratchet wheel 185, Figs. 28 and 29, integral with or rigidly secured to the sprocket wheel 183 and adapted to be engaged by the horizontal arm 186 of a bell crank shaped pawl 187. The pawl 187 is mounted on the slide 171 by means of a fixed pivot stud 188. The pawl 187 has a substantially upright arm 189, the upper end of which is connected with the upper end of a tension spring 190. The lower end of tension spring 190 is connected by means 191 with the slide 171. The relative locations of the connections of the two ends of spring 190 and the center of the pivot stud 188 are so arranged that when the horizontal arm 186 of the pawl 187 is in engagement with the ratchet wheel 185, the line of pull of said spring 190 will be to one side of the center of the pivot stud 188, and the pawl will be urged into engagement with the ratchet wheel 185, but when the horizontal arm 186 of the pawl 187 is moved free of the ratchet wheel 185, as shown in Fig. 28, then the line of pull of the spring 190 will be to the other side of the pivot stud 188 and the pawl 187 will be held clear of the ratchet wheel 185.

When the slide 171 and pusher frame 158 are in the retracted or inoperative position, the pawl 187 will be clear of the ratchet wheel 185 as shown in Figs. 22 and 28 and the sprocket wheel 183 will be rotated continuously by the continuously driven link belt 179. The operation of the slide 171 and pusher mechanism connected therewith is started by the release of the trigger member 122, see Figs. 2 and 32, when the rear or trailing end of a bundle of lumber passes off of said trigger member as said bundle is being transferred onto the rolls 131 at the discharge portion of the machine. The release of this trigger member 122 closes a circuit to and energizes a solenoid 192 (Figs. 28, 29 and 32). The energizing of solenoid 192 retracts the plunger 193 of said solenoid. This exerts a pull on a link 194 and angularly moves lever means 195 and 195' mounted on a fixed part of the machine frame. Lever means 195' is connected by a link 196 with a trip bar 197. The trip bar 197 is slidably mounted in bearings 198, Figs. 28 and 29, and has a shoulder 198' positioned so that it will engage with the upper end portion of the upright arm 189 of the pawl 187 upon movement of the trip bar 197 by the energizing of solenoid 192, and angularly moves said pawl on its bearing 188 far enough to cause the horizontal arm 186 of said pawl to engage with the ratchet wheel 185. Also this angular movement of the pawl 187 will shift the line of pull of the spring 190 forwardly past the center of the pivotal bearing 188 and the spring 190 will yieldingly hold the pawl 187 in an engaged position relative to the ratchet wheel 185. A compression spring 199 on the trip bar 197 will retract said trip bar as soon as solenoid 192 is deenergized. The circuits connected with solenoid 192 and trigger switch 122 are more fully hereinafter described in connection with the wiring diagram, Fig. 32.

As soon as pawl 187 engages with ratchet wheel 185 and stops the rotation of sprocket wheel 183, the slide 171 and all parts connected therewith will be moved forwardly by the travelling link belt 179. This forward movement will be communicated to the pusher frame 158 by the connecting rod 177 and, as this pusher frame 158 is moved through the forward portion of its stroke, it will be moved inwardly by the link members 159 into line with the rear or trailing end of the bundle of lumber which has just been transferred to the rolls 131.

The slide 171, together with the pusher frame member 158 will continue to move forwardly until the top end of the upright arm 189 of the pawl 187 strikes against an adjustably mounted fixed trip member 200 and the pawl is thereby disengaged from the ratchet wheel 185, whereupon forward movement of these parts will stop. Before this forward movement is stopped, the spring loaded pusher fingers 157 will have engaged with the rear ends of the pieces of lumber in the bundle and pushed the previously squared and trimmed forward ends of all of said pieces of lumber against a stop bar 130 at the forward end of the bundle. The possibility of disarrangement of any of the pieces of lumber in the bundle before or during the clamping operation is prevented by holding the pusher member in the extreme forward position until after the clamps are fully applied. This is accomplished by providing on the front end of the slide 171 a forwardly extending arm 201 having a catch member 202 adapted to be engaged by a gravity actuated hook 203 at substantially the location where the slide reaches the forward limit of its travel. The hook 203 is pivotally mounted on a T shaped bracket 204 and is arranged to rest on a stop 205 on said bracket. This stop 205 limits the downward swinging movement of the hook 203 relative to the bracket 204 and positions the hook 203 for engagement with the catch member 202. The bracket 204 is mounted by a pivot 206 on a fixed part of the frame of the machine. A stop member 208 limits the turning movement of the bracket 204 on the pivot 206 in one direction. The bracket 204 is held in the locking position by a pivot bar 207 until the bundle is clamped. As the saws move forwardly and just before the saws start to make the cut, this pivot bar 207 is released and allowed to drop down, and the hook 203 is elevated by the pull of the catch 202 and releases the catch 202. This leaves the slide and pusher member free to return to the retracted position. The arms of the T shaped bracket 204 are substantially similar and the weight of the hook 203 tends to move the T shaped bracket 204 by gravity to a position where the T shaped bracket 204 rests against stop 208 and where hook 203 rests against stop 205 (see Fig. 28).

The means for holding pivot bar 207 in engagement with T shaped bracket 204 comprises a roll 209 positioned on the end of the pivot bar 207 opposite to the end which engages bracket 204. The said roll 209 is adapted to engage a slide 210 slidably mounted on guide rods 211, which guide rods are fixedly mounted on the main frame of the machine. Slide 210 is pivotally connected with a forked bracket 212, which bracket is rigidly secured to the end portion of the transverse shaft 119. The transverse shaft 119 is connected to the saw frame and is reciprocated by the stroking of the saws.

If the pusher member 156 should be obstructed as it moves inwardly and forwardly, as might occur in the event a bundle of lumber becomes misplaced and is engaged by the side of said pusher member, then a compression spring 177' in the connecting rod means 177, see Fig. 31, will be compressed and the connecting rod means elongated. This causes the arm 189 of pawl 187 to engage with a shoulder 197'' on the slide member 197' and trips the pawl 187 clear of the ratchet wheel 185, thus stopping further forward movement of the pusher member and preventing damage to the machine. The slide member 197' is connected with the bracket 178 at the rear end portion of the pusher frame 158 by a link member 177'' which moves the slide member 197' synchronously with lever 187 except when the spring 177' is compressed as above set forth.

After the bundle has been clamped at the discharge portion of the machine, the forward stroking of the saws positively retracts the pusher member 156. The means for retracting the pusher member 156 as the saws are stroked forwardly comprises a cable 213 connecting the rear end portion of the pusher frame 158 with a lever arm 213' which is fulcrumed on a pivot 213''. Another cable 214 is connected with the lever 213' intermediate the pivot 213'' and the point of connection of the lever 213' with the cable 213. The cable 214 passes around a sheave 214', thence forwardly and around another sheave 214'', thence upwardly and around still another sheave 215, thence inwardly toward the pusher frame 158 and is fixedly anchored at 217 to the frame of the machine. The sheave 215 is rotatably mounted in a bracket 216. The bracket 216 is slidably mounted on the guide rods 211 and is positioned so that it will be engaged by the slide 210 and moved outwardly as the saws are stroked forwardly. Outward movement of the sheave 215 will exert a pull on the cable 214, taking up said cable 214 and angularly moving the lever arm 213' in a counterclockwise direction as respects the showing in Fig. 21. This will exert a pull on the cable 213 and retract the pusher member as the saws are stroked forwardly, thereby obviating all possibility of the rapidly rotating saws encountering the pusher member on their forward stroke. By permanently anchoring one end of the cable 214 at point 217 and moving the sheave 215, around which said cable passes, I am able to substantially double the speed of movement and the amount of movement or take up of that portion of the cable between the sheave 215 and lever arm 213'. This increases both the speed and the amount of movement of the lever arm 213' for a given movement of the saws and retracts the pusher member faster and to a greater distance than would otherwise be possible. The use of the lever arm 213' in the pusher member retracting mechanism further increases the speed of retraction and distance of retraction of the pusher member due to the fact that the point of the lever arm 213' with which the cable 213 is connected will move faster and farther than the point with which the cable 214 is connected in response to take up of the cable 214. I find that this increase or multiplication of speed and distance of movement of the pusher member is desirable to insure getting said pusher member out of the way of the saws. The bracket 216 is slidable on the guide rods 211 independently of the slide 210 and is not connected with the slide 210. When the slide 210 is moved outwardly by the forward stroking of the saws it will engage with the bracket 216, move said bracket 216 outwardly and retract the pusher member. When the slide 210 is moved inwardly, by retraction of the saws, the bracket 216 and sheave 215 will remain in their outermost position until the pusher member is again moved forwardly, and, by its forward movement, exerts a pull on the cable 214 which moves the bracket 216 inwardly along rods 211 to a position in close proximity to the slide 210. Preferably spring means 218 is provided to prevent the pusher member 156 from drifting forward. This spring means 218 may operatively engage with the pusher member 156 by a connection with a link 159 at one end and by a fixed connection at the other end.

The rock-shaft 67, which is operated by the clamp cam 61, has other clamp means 219, Figs. 5 and 16, for bundles of lumber in the lower level toward the discharge end of the machine. These lower clamps 219 operate simultaneously with clamps 60 and as the clamps themselves are similar to the clamps 60, said clamps 219 will not be discussed in detail.

Fig. 5 shows the two clamps 219 in plan and also shows the operating means for the clamps 219 on the rock-shaft 67. The rock-shaft 67 is provided with levers 220, each of which connects through links 221 to levers 222, see Fig. 16. Levers 222 are pivoted on pivots 223. The other end of each of the levers 222 is pivotally connected with a sleeve 224 which is slidably mounted on a link 225. Disposed between the link 225 and the sleeve 224 is spring means 226 which is secured to the link 225 by means of the nuts as indicated. Each of the L shaped clamp arms 227 has one end pivotally connected to the link 225 and the other end supports the vertical and side pressure means of the clamp 219 similar to the means 79 and 77 of clamp 60. Each of the L shaped arms 227 is pivotally connected to a lever 228 by pivot means 229. The lever 228 is pivotally mounted on a pivot 230 and has a stop means 231 limiting the angular movement in one direction. The upper end of the lever 228 is pivotally connected to a link 232. The link 232 has a spring means 233 disposed between nuts on the link 232 and the upright support 234, which is similar to the upright support 45.

In the operation of the machine lumber at the higher level or intake portion of the machine is clamped by clamp 60 and the bundle is tied and one end is squarely trimmed by saw 104. At the same time the bundle in the lower level or discharge end of the machine is clamped by clamps 219, and the other end of a bundle is squarely trimmed by saw 105.

After the bundle of lumber supported on rolls 131 has the remaining end of the same trimmed, the clamps are released and the advance stop position, previously discussed, is reached. At this time a bundle is being supported by the drawbars 39, the clamps 60 have been released, one end of the bundle has been squarely trimmed and the bundle has been tied. Upon the starting or continuing of the machine after the advanced stop is reached, the drawbars 39 drop the bundle previously supported by them to the endless conveyor belt 57, as previously described, and at the same time the kick-off cam 121 operates to eject the bundle of lumber which was supported on rolls 131.

Referring to the operation of the kick-off cam 121, said kick-off cam is secured to the cam shaft 47, see Fig. 9. A bell crank 235 has a roller 236 conected to one arm thereof, said roller being adapted to roll over and engage the surface of the kick-off cam 121. The bell crank 235 is fulcrumed on a fixed shaft 237 and has its other arm pivotally connected to link 238. Link 238 is pivoted to a lever 239, which lever has one end fixedly secured to a rockshaft 240. Levers 241 are secured to rockshaft 240 and are connected by links 241' to ejector members 242. As the cam 121 is rotated it acts through the links and lever means shown, to move ejector members 242 horizontally, thereby moving the bundle 36 from the full line position shown in Fig. 9 to the dot and dash line position shown in Fig. 9. As the ejector members 242 are rapidly returned from the dot and dash line position shown in Fig. 9 to the full line position shown in Fig. 9, the bundle will slide off of the ejector members 242 and down the inclined members 243.

In the event that the single acting cam, as indicated in Fig. 9, is used, a tension spring 244 is employed to maintain contact between the roller 236 and the cam 121. Such tension spring 244 may have one end connected to one of the levers 241 and the other end fixedly secured to the main frame of the machine.

In Fig. 33, I have indicated one form of a double acting cam which may be used in place of the single acting kick-off cam 121. Many varieties of double acting cams, i. e., where the roller engaging the cam surface is both pushed and pulled by the cam, are known. One of such cams is indicated in Fig. 33. Here the cam comprises a cam disk 245 having a groove 246 in one face thereof. A suitable roller 247 is provided on one end of a bell crank 248, which roller will roll within the groove 246. As the cam rotates, the bell crank 248 will be angularly moved in one direction by engagement of the roller with the inner surface of the groove 246, and when the roller engages the outer surface of the groove 246, the bell crank will be angularly moved in the other direction. When the double acting cam shown in Fig. 33 is used in connection with the mechanism illustrated in Fig. 9, the ejector members 242 will be returned by the cam to the full line position shown in Fig. 9, and the tendency of the spring 244 to angularly move the cam shaft will be eliminated.

Obviously, double acting cams may be substituted for the other cams previously described, and the springs eliminated for the same purpose as just described in connection with Fig. 33 and the kick-off cam.

In the event that it is desired to end print the bundles with trade-marks and the like, this, of course, must be done after the ends have been trimmed and the saws retracted. As a means of end printing one end of the bundle at the higher or intake portion of the machine and at the same time to end print the bundle at the lower or discharge portion of the machine, I have provided the printing mechanism indicated in detail in Figs. 13 and 14. The transverse shaft 119, which is reciprocated by the swinging movement of the saw frames 110 and 114 is utilized in the operation of the end printing devices. These end printing devices are preferably in duplicate on each side of the shaft 119. Each of said printing devices comprises an upright shaft 249 upon which is mounted a printing die 250, which may be provided with conventional inking means (not shown). Printing dies 250 are respectively positioned opposite the ends of the two bundles 36 to be printed, which bundles are at different elevations, as shown in Fig. 14. Printing dies 250 are each secured to sleeve members 251 which are mounted for angular movement on upright shafts 249. Lever arms 252 are rigidly secured to sleeves 251 and pawls 253 are adapted to engage with lever arms 252. The pawls 253 are pivotally mounted as by pivots 254 on arms 255 secured to shaft 119. The pawls 253 each have one end portion connected with a tension spring 256, urging the pawl 253 against a stop 257 formed by the end of the arm 255. By this mounting, the pawls are free to move angularly and slide past the ends of the lever arms 252 when the shaft 119 is moved in one direction, and said pawls will engage with and move the lever arms 252 when the shaft 119 is moved in the opposite direction. Stop members 258 are provided for engagement by printing dies 250 and springs 259 are connected with said printing dies and urge the same into retracted positions. As the saws are stroked forwardly to trim the ends of the bundles, the shaft 119 and parts conected therewith will be moved from the position indicated by dot and dash lines, to the position shown by full lines in Fig. 13, and the pawls 253 will engage with the ends of lever arms 252 and be angularly moved on their pivots 254 without moving the printing dies 250, said pawls 253 riding past the lever arms 252 and snapping out into the position shown in Fig. 13. As the saws are retracted after making a cut and shaft 119 moves the arms 255 from the full line position shown in Fig. 13 back toward the dot and dash line position, the pawls 253 will be moved therewith and by engagement with lever arms 252 will move the printing dies 250 into contact with the ends of the bundles, thereby end printing the bundles with the desired mark. At the time the printing dies have reached the printing position indicated by dot and dash lines in Fig. 13, the pawls 253 will move past and release the lever arms 252 and the printing dies will be snapped back into the full line position shown in Fig. 13 and will rest against stops 258 preparatory to the next printing operation. By this mode of operation it will be seen that each bundle of lumber will have each end printed immediately following the end trimming thereof.

To provide means for side printing the bundle to place indications, such as a grade mark thereon, I have provided the side marking means indicated generally by 260 in Figs. 3 and 5, and shown more in detail in Fig. 15. This grade marking device comprises a bracket 261 provided with a plurality of verticaly slidable shafts 262 carrying dies 263 which may be provided with the usual inking mechanism (not shown). The shafts 262 have compression springs 264 thereon interposed between the bracket 261 and head members 265 on said shafts. These springs normally hold the dies 263 clear of the bundle of lumber. The bracket 261 is secured to an upright shaft 266 which is pivotally mounted in fixed supporting means 267. This shaft 266 is arranged to be angularly moved to selectively position any predetermined die member 263 above the bundle to be printed. The moving means for the shaft 266 comprises a sprocket wheel 268 on the lower end portion of said shaft 266 connected by a link belt 269, see Figs. 1 and 2, with another sprocket wheel 270 on an upright shaft 271, which shaft has a lever arm 272 on its upper end portion. The lever arm 272 is positioned so as to be readily accessible to an operator of the machine, whereby said operator, by angularly moving the lever arm 272, may position any predetermined die member 263 above the bundle of lumber to be stamped. Two of the die members 263 have been shown in the drawings, but obviously more of said die members may be provided in case it is desired to provide for the marking of more than the two grades of lumber. The die members 263 are operated, to provide contact with the surface of the bundle to be printed, by means of an upright shaft 273 having a die member engaging element 274. The die member engaging element 274 is secured to the shaft 273 at right angles thereto and on the upper end thereof, and is positioned so that it will be above a die member 263 to be operated when said die member is in position for printing. The upright shaft 273 is moved vertically by a bell crank lever 275 fulcrumed on pivot 276 and connected by a link 277 with a lever arm 278 on the clamp rock-shaft 67. When the clamp rockshaft 67 is angularly moved in applying the clamps, the lever arm 278 will be angularly moved therewith and will move the upright shaft 273 downwardly, thus causing die member 274 of said upright shaft 273 engaging element 274 of said upright shaft 273 to engage with the top of the die 263, which is positioned above the bundle, and depress said die into printing position on the top side of the bundle. At the time the operators complete the tying of the bundle at the intake portion of the machine and previous to the dropping of said bundle, the operators will have an opportunity to observe the grade of the piece of lumber on the top of the bundle and may set the lever 272 in accordance with the observed grade to properly position the grade marking dies 263 so that they will print said grade on the bundle after it has been dropped, transferred to the discharge end of the machine, and while it is there being clamped. It will be understood that the bundle of lumber has been previously made up of pieces which are all of the same grade, so that the operator may readily correctly grade the entire bundle.

Continuously driven electric motor 279, Fig. 5, is provided with a sprocket wheel 280. Link belt 281 connects sprocket wheel 280 with sprocket wheel 282. Sprocket wheel 282 is idly mounted on cam shaft 47. The operation of the various cams connected to the cam shaft 47 has been heretofore discussed. The clutch means forming the driving connection between the idly mounted sprocket wheel 282 and the cam shaft 47 is indicated generally by 283 in Fig. 5, and the same is shown in detail in Figs. 17, 18, and 19. This clutch mechanism comprises a driving disk 284 secured as by bolt means 285 to the continuously driven sprocket wheel 282. The bolt means 285 have heads thereon which form driving buttons 286 at one side of the driving disc 284. Six of these driving buttons are shown, but obviously a less or greater number of the same may be used. A driven clutch member 288 is non-rotatably secured to the cam shaft 47 as by a key 287 shown by broken lines in Fig. 19. The driven clutch member 288 has a spring loaded driven pin 289 mounted for sliding movement therein in a direction at right angles to the plane of the driving disk 284. The end of driven pin 289 adjacent the driving disk 284 is adapted to engage with the driving buttons 286 or to be withdrawn clear of said buttons. The driven pin 289 is axially bored for the reception of a compression spring 290, one end of which spring abuts against the inner end of the bore in the pin 289, and the other end of which spring abuts against a plug member 291 which is supported by a transverse yoke 292. The yoke 292 extends cross-wise of the plug member 291 and is secured by screws 293 to the driven clutch member 288. Spacer members 294 are interposed between the yoke 292 and the driven clutch member 288 and the screws 293 pass through said spacer members. The driven pin 289 has a disk like head 295 of substantially larger diameter than said driven pin 289 provided thereon, said head 295 being positioned between the yoke member 292 and the face of the driven clutch member 288. A conical surface 296 is provided on the inner side of the head 295. The driven pin 289 may serve as a driving connection between the driven clutch member 288 and the driving disk 284.

The means for withdrawing or retracting the driven pin 289 out of the path of the driving buttons 286 is in the nature of a final stop wedge member 297 and an advance stop wedge member 298. These wedge members 297 and 298, respectively, are positioned on substantially opposite sides of the driven clutch member 288 and are arranged to be moved into the path of the head 295 of the driven pin 289 to engage with the conical surface 296 of said head 295 of said driven pin 289. The wedge members 297 and 298 are each provided with inclined surfaces 299, Fig. 17, adapted to cooperate with the conical surface 296 of head 295. The wedge members 297 and 298 are fixedly secured to a horizontally movable wedge yoke 300. The wedge yoke 300 is pivotally connected by a link 301 with a fixed supporting member 302 and is further connected by a pivot member 303 with an upright arm 304 which is fulcrumed on the cam shaft 47. The upright arm 304 has a horizontal lever arm 305 rigidly secured thereto by which said upright arm 304 may be angularly moved to impart substantially horizontal movement to the wedge yoke 300. A solenoid 306 is connected by a link 309 with the outer end portion of the horizontal lever arm 305 and is arranged to exert a pull in a downward direction thereon, tending to move said horizontal lever arm 305 into a position indicated by dot and dash lines in Fig. 18, in which position said lever arm 305 will be stopped by engagement of a stop screw 307 on said lever arm with a fixed frame member 308. A link 310 is provided on the outer end portion of lever arm 305 for connection with a solenoid 311. The operation of solenoids 306 and 311 is more fully hereinafter described in connection with the wiring diagram, Fig. 32. When the horizontal lever arm 305 is in the raised position shown by full lines in Fig. 18, the advance stop wedge member 298 will be positioned in the path of the head member 295 of the driven pin 289. In this position advance stop wedge member 298 will engage with the conical surface 296 of driven pin 289 and withdraw said pin when said pin reaches the position of the advance stop wedge 298. This position corresponds to the advanced stop position of the cam shaft 47 in which the cycle of operation of the machine is interrupted or stopped before completion of said cycle, as hereinafter set forth. When the horizontal lever member 305 is lowered into the dot and dash line position shown in Fig. 18, then the advance stop wedge 298 will be clear of the path of the head member 295 of the driven pin 289 and the final stop wedge 297 will be positioned in the path of said head member 295 of said driven pin 289. In this position the head member 295 will not be stopped in the advanced position, but will continue in its rotation until it contacts final stop wedge member 297, by which said driven pin 289 will be withdrawn and the driven clutch member 288 disengaged from the driving disk 284 at the end of the cycle.

When the solenoid 311 is deenergized and solenoid 306 is energized, the horizontal lever arm 305 will be held in the lowermost position with the stop screw 307 engaging the fixed frame part 308. This will retract the advance stop wedge 298 and move the final stop wedge 297 into the operative position, as shown by dot and dash lines in Fig. 18. The driven pin 289 will then be retracted by the final stop wedge 297 and the machine stopped at the end of the cycle. With the clutch mechanism stopped in the final stop position, a cycle of operation of the machine may be started by energizing the solenoid 311 and deenergizing solenoid 306, which will retract the final stop wedge 297 and release the driven pin 289. When the cycle is thus started, the cam shaft 47 will continue to turn until the advanced stop position is reached regardless of the energizing or deenergizing of solenoid 306 or 311. If solenoid 311 is energized and solenoid 306 deenergized at the time the pin 289 reaches the advanced stop position, then the cam shaft 47 will be stopped at this advanced stop position and will remain stopped until the solenoid 311 is deenergized and solenoid 306 energized, whereupon, the driven pin 289 will be released and the cycle continued to the final stop position. If the solenoid 311 has been deenergized and the solenoid 306 energized before the driven pin 289 reaches the advanced stop position, then the cycle of operation will continue without interruption until the final stop position is reached.

Referring to the wiring diagram in Fig. 32: A source of electrical energy 312 is used to energize the various circuits. In the wiring diagram I have indicated a three phase circuit. However, it is to be understood that this is only by way of illustration. Conductors 313 connect a source of electrical energy 312 with a solenoid controlled switch 322. Solenoid controlled switch 322 is connected with conductors 314. Belt motor 152, cam shaft motor 279, upper saw motor 113, and lower saw motor 112 are respectively connected by conductors 315, 316, 317 and 318 with the conductors 314. Fuse members 319 are provided, where desirable, in the conductors 315, 316, 317 and 318. Conductor 320 is connected after a fuse 319 of one of the conductors 317 to the upper saw motor 113 and forms one of the conductors furnishing energy for a control circuit which controls the operation of the various mechanisms in this machine. Another conductor 321 furnishing energy for the control circuit is connected to one of the conductors 318 leading to the lower saw motor 112, preferably after a fuse 319, and is connected to one of the wires having a potential difference as respects the conductor selected from the conductors leading to upper saw motor 113. In the event that either the upper saw motor 113 or the lower saw motor 112 blows a fuse, which normally results in the blowing of all fuses 319 interposed in the circuit to that motor, then energy will not be furnished to the conductors 320 and 321.

Conductor 321 connects with a conductor 323, thence to a solenoid controlled switch 324 and solenoid controlled double pole switch 325. Solenoid controlled switch 324 opens by gravity when solenoid 326 is de-energized and closes when solenoid 326 is energized. Solenoid controlled double pole switch 325 closes when solenoid 327 is energized and opens by gravity when solenoid 327 is de-energized. A switch 328 has a mechanical connection with the solenoid controlled double pole switch 325 and the switch 328 is mechanically closed when solenoid controlled double pole switch 325 is opened. When solenoid controlled switch 324 is closed, the energy passes from conductor 321, along conductor 323, through switch 324, along conductor 329, through final stop solenoid 306, and thence along conductor 330 to the other source of energy 320, thus completing the circuit energizing the final stop solenoid 306. The solenoid 326 operating solenoid controlled switch 324, has a conductor 331 connecting one end of the same solenoid through conductor 323 to source of energy 321. The other end of the solenoid 326 is connected by conductor 332 through switch 328 along conductors 333 and 334 to the other source of energy 320. It will be thus seen that solenoid 326 controlling solenoid controlled switch 324 is energized when solenoid controlled double pole switch 325 is de-energized. When solenoid controlled double pole switch 325 is energized, energy from conductor 321 passing along 323 passes through the switch blade 335 of switch 325, along conductor 336 through advanced stop solenoid 311, and thence along conductor 330 to the other source of energy 320. When advanced stop solenoid 311 is energized it will be seen that final stop solenoid 306 is de-energized, because of the connection between solenoid controlled switches 324 and 325, and the cam shaft 47 will stop in the advanced stop position. The control circuit for energizing solenoid controlled double pole switch 325, and in turn the solenoid 311, comprises a conductor 337 connected through conductor 323 with a source of energy 321 and connected to one end of the solenoid 327. The other end of the solenoid 327 is connected by a conductor 338 through a bundle controlled switch 339. Switch 339 is positioned on the machine, see Figs. 2 and 32, and is closed when a bundle is in place on the drawbars 39. Energy passing through the switch 339 passes along conductor 340 and through a switch 341. Switch 341 is a foot controlled switch, see Figs. 1, 2 and 32, and is used by an operator who starts the cycle of operation, i. e., he energizes solenoid 311, de-energizes solenoid 306, retracts final stop wedge 297, and releases driven pin 289. When a bundle is in place on drawbars 39 closing bundle controlled switch 339 and the operator closes foot switch 341, energy passes from source of energy 321, along conductors 323 and 337 through solenoid 327, along conductor 338, through switch 339, and along conductor 340, through switch 341, along conductor 342, through switch 343, along conductor 344 (providing switch 343 is closed by the ram 156 being in the retracted position, see Fig. 21) or along conductor 345, through contacts 346 by means of blade 347 (providing the ram is in the forward position) and then along conductor 348, through switch 349, along conductor 350, along conductor 351, and through contacts 352 by means of blade 353, along conductor 354 and conductor 355, to source of energy 320. It will be seen that the ram 156 must either be in the extreme retracted or extreme forward position in order to provide a circuit to energize solenoid 327 and close double pole switch 325, which opens switch 328, thus de-energizing solenoid 326 and opening switch 324. The closing of double pole switch 325 closes the circuit to advanced stop solenoid coil 311 and energy passes from source of supply 321 along conductor 323 through switch blade 335 of solenoid controlled switch 325, along conductor 336, through advanced stop solenoid coil 311, along conductor 330, to source of supply 320. When advanced stop solenoid 311 is energized it will be seen that final stop solenoid 306 is de-energized and cam shaft 47 will rotate approximately one-half turn, clamping and trimming one end of bundle. During this period of time the bundle is being tied, and if this circuit is not disturbed, the machine will automatically stop in the advanced position, due to double pole switch 325 being held closed by energy passing from source of supply 320, along conductor 334, along switch blade 356, along conductor 357, through normally closed foot switches 358, along conductors 359 and 338, through solenoid 327, along conductors 337 and 323 to source of energy 321

This control circuit will maintain energy to solenoid 327 and maintain solenoid controlled double pole switch 325 closed, unless one of the foot switches 358 is opened. As two or more operators are useful to provide for rapid operation, and each tie one or more loops around the bundle, it will be seen that operator positioned adjacent switches 358 can prevent the de-energizing of solenoid 311, and this solenoid cannot be de-energized without opening one of the switches 358. This permits the operator adjacent to switches 358 to maintain solenoid 311 energized until he has completed his tie. The switch 341 which was closed by the operator adjacent to said switch 341, energized solenoid 327 and in turn energized solenoid 311. If switch 341 is maintained closed, the solenoid 311 will remain energized until the operator adjacent to switch 341 opens switch 341 and the operator adjacent to switches 358 opens one of the switches 358. At this time the operator adjacent to switch 341 opens switch 341 and the operator adjacent to switches 358 opens one of switches 358, which de-energizes solenoid 327, opening double pole switch 325, which de-energizes solenoid 311. When switch 325 opens, switch 328 closes, completing the circuit through solenoid 326. The energizing of solenoid 326 results from energy passing from source of supply 321 along conductors 323 and 331, through solenoid 326, along conductors 332, through switch 328, along conductors 333 and 334 to source of energy 320. This closes solenoid operated single pole switch 324, which in turn energizes solenoid 306 which retracts the driven clutch pin 289 and cam shaft 47 rotates the remainder of the revolution. This retracts the drawbars 39, dropping the bundle onto the transfer belt 57. This bundle which has been tied and has had one end trimmed is carried by transfer belt 57 towards the left as respects the showing in the drawings, past the saws 104 and 105. In its travel this bundle passes over trigger member 122 moving switch plunger 360, opening contacts 352 and closing contacts 361. The opening of contacts 352 de-energizes solenoid 362, opening solenoid operated switch 363.

It will be noticed that this switch 363 is closed when the trigger 122 is not depressed by a bundle. The closing of this switch 363 results from energy passing from conductor 321 along conductor 364, through solenoid 362 of solenoid controlled switch 363, along conductor 351, through blade 353, which interconnects contacts 352, which blade is so positioned because of the position of trigger member 122, and thence along conductors 354 and 355 to the conductor 320, thus completing the circuit. With such circuit complete, solenoid controlled switch 363 is closed, which energizes solenoid 123. The circuit for energizing such solenoid 123 may start with conductor 320, through solenoid 123, thence along conductor 363', along the blade of solenoid controlled switch 363 to conductor 321, thus completing the circuit.

When the trigger member 122 is depressed, blade 353 interconnects contacts 361, establishing the following circuit: This circuit permits energy to flow from source of energy 320 along conductors 355 and 354, through contacts 361 and blade 353, conductor 365, solenoid 366, conductor 367, to source of energy 321. This energizes solenoid 366 closing solenoid controlled switch 368, and establishing a circuit through solenoid 124. Energy will now pass from source 320 through solenoid 124 along conductor 369, through blade of solenoid controlled switch 368, along conductor 367 to source of energy 321. In other words, whenever trigger member 122, by reason of a bundle resting thereon, is depressed, solenoid 124 is energized, and solenoid 123 is de-energized, while if trigger member 122 is not depressed by a bundle, solenoid 123 is energized and solenoid 124 is de-energized. Solenoid operated switch 368 is mechanically connected with switch 370 which is open when solenoid operated switch 368 is open, and closed when solenoid operated switch 368 is closed. Therefore, when solenoid operated switch 368 is closed, due to the bundle of lumber depressing trigger member 122, a further circuit is established. The closing of switch 370 sets up a circuit from source of energy supply 320, along conductors 355, 354 and 371 through switch 370 along conductor 372 through solenoid 373, along conductor 374, through contacts 375, and contact blade 347, along conductor 376, to source of energy 321, thus energizing solenoid coil 373 and closing solenoid operated double pole switch 377. It will be seen that although solenoid operated double pole switch 377 is closed, there will be no circuit established through ram solenoid 192 due to solenoid operated switch 363 at this instant being open, due to the presence of a bundle on the trigger 122, which opens the circuit between contacts 352, as above described. Also it will be seen that with the closing of double pole switch 377 the mechanically connected switch 349 has been opened, thus preventing completion of a circuit through the solenoid 327 of solenoid operated switch 325 and preventing the energizing of clutch solenoid 311 and the resultant stroking of the saws while a package is passing over the trigger switch member 122.

The energizing of either one of the solenoids 123 or 124 and simultaneous de-energizing of the other solenoid operates the stop bracket shaft 129 as described previously in connection with Figs. 3, 5, 10 and 11.

When the trailing end of the bundle passes off the trigger member 122, electrical connection between contacts 361 is broken and electrical connection between contacts 352 is established by contact blade 353, closing the circuit from source of energy 320 along conductors 355 and 354, through blade 353, along conductor 351, through solenoid 362 along conductor 364, to source of energy 321, closing solenoid operated switch 363 and opening solenoid operated switch 368.

Although solenoid operated switch 368 is opened and its mechanically connected switch 370 is also opened, energy is maintained on solenoid coil 373 of solenoid operated double pole switch 377, due to a holding circuit maintained from source of supply 320 along conductors 355 and 378, through switch blade 379, along conductor 380, through coil 373, along conductor 374, through contacts 375, and contact blade 347, along conductor 376, to source of energy supply 321. Therefore, with this holding circuit maintaining solenoid controlled double pole switch 377 closed and the closing of solenoid operated switch 363, as explained above, the circuit through ram solenoid 192 is completed from source of energy 320 along conductor 355, through switch blade 381, along conductor 382, through ram solenoid coil 192, along conductor 383, through switch 363 to source of energy 321. This results in the engaging of the latch or pawl 187 with the ratchet 195 of the ram, see also Figs. 22, 28 and 29, driving the ram forward against the trailing end of the bundle and pushing the bundle against one of the stop bars 130. At the completion of this forward movement the gravity actuated hook 203, see Fig. 28, engages catch member 202 as described previously, and holds the ram fingers against each piece of the bundle of lumber, also at the completion of the forward travel of the ram 156, the link member 159 attached to the ram frame presses against switch plunger 384 moving blade 347 out of electrical connection with contacts 375 and into connection with contacts 346, de-energizing solenoid 373, allowing solenoid operated switch 377 to open by gravity, which in turn de-energizes ram solenoid 192. At this time the operators have moved a bundle onto drawbars 39 and are ready to tie and trim, operator adjacent to foot switch 341 closes switch 341 which completes a circuit from source of supply 320, along conductors 355 and 354, through contacts 352 by means of blade 353, along conductors 351 and 350, through switch 349, along conductor 348, through contacts 346, by means of switch blade 347, along conductors 345 and 342, through switch 341, along conductor 343, through bundle operated switch 339, along conductor 338, through solenoid coil 327, along conductors 337 and 323, to source of energy supply 321, closing solenoid operated switch 325, and opening solenoid controlled switch 324, resulting in de-energizing solenoid 306, and energizing solenoid 311 and thus operating clutch 283, resulting in clamping and trimming the leading end of the bundle on the upper level and the trailing end of the bundle on the lower level as previously described. This completes the full cycle of operation through the controls.

In the event that an operator is positioned adjacent to switch 341 and an operator is positioned adjacent to switches 358 either operator may prevent the dropping of the bundle until he has completed his tie. At the zero position indicated in the cam diagram, Fig. 20, it must be borne in mind that a bundle is resting on the draw bars 39, while another bundle is resting on the rolls 131, and that the ram 156 is in its forward position urging the bundle resting on rolls 131 against one of the stop bars 130. In this position the operator adjacent switch 341 may start the cycle of operation by closing switch 341, which, through the electrical means illustrated in Fig. 32, closes solenoid controlled switch 325, which in turn energizes solenoid 311 and de-energizes solenoid 306. This withdraws the final stop wedge 297 and sets the advanced stop wedge 298, thus starting the cam shaft 47 to rotate. As the cam shaft 47 rotates, the clamp cam and saw cams operate, as indicated in Fig. 20. As the saw cam operates, the ram 156 is retracted, as previously described. It is important to note that the ram is completely retracted at the time the saws reach their maximum advanced position, which is indicated in Fig. 20 as being at 130°. While the ram is moving it is obvious that the operator adjacent switch 341 cannot prevent the opening of solenoid controlled switch 325. However, the ram is being withdrawn during that portion of the travel of the cam shaft designated between 10° and 130° in Fig. 20. During such portion of the travel neither the switch 343 or the switch 346—347 will be closed so the operator adjacent switch 341 can not prevent an operator adjacent switch 358 from opening solenoid controlled switch 325. As the opening of solenoid controlled switch 325 merely retracts advanced stop wedge 298 and sets final stop wedge 297, operation of switch 325 during that portion of the travel of the cam shaft from 10° to 130° will not affect the operation of the machine as the cam shaft is rotating and the driven pin 199 is in such portion of its travel as not to be affected by either the position of the advanced stop wedge 298 or the final stop wedge 297. Should the operator adjacent one of the switches 358 open solenoid controlled switch 325 during that portion of the travel from 10° to 130° of the cam shaft 47, then upon reaching the position of 130° the switch 343, Fig. 32, will be closed as the ram 156 is completely retracted and the operator adjacent switch 341, by maintaining said switch closed, will close solenoid controlled switch 325, thus setting the advanced stop wedge 298 before the driven pin 289 has reached the position of said advanced stop wedge 298. Upon reaching the advanced stop position at 230° of the travel of the cam shaft 47 if the advanced stop wedge 298 is set, the machine will stop at the advanced stop position. If said advanced stop wedge 298 is retracted before said advanced stop position is reached or if the advanced stop wedge 298 is retracted after said advanced stop position is reached, then the cam shaft 47 will be rotated through the remaining part of its cycle from 230° to 360°. During this remaining portion of the travel of the cam shaft the solenoid controlled switch 325 is always open so the control of the machine does not require joint control of said switch 325 by the operators adjacent switches 341 and 358.

From the foregoing description it is evident that either of the operators, positioned adjacent switches 341 or 358, can prevent the dropping of the bundle and the starting of the second portion of the cycle of operation of the machine.

An additional safety feature has been provided to take care of an emergency which would exist should the cable 214 for retracting the ram break and fail to retract the ram, thus leaving the ram in the forward position and in line with the stroking saws. Fixed to the upper saw frame is a bracket 385 which extends along the side of the saw 104 and projects somewhat ahead of said saw at such a level that it will contact the side of the ram 156 ahead of the saw. Also as described before, the pivot point 160 of the forward link member 159 of the ram 156 is supported on a pivoted lever 390 held in place normally by a spring 392 and normally holding closed switch 388 which controls the opening and closing of solenoid operated switch 322 and in turn controls the energizing of cam motor 152, belt motor 279 and saw motors 112 and 113. Thus, should the retracting cable 214 break or any other condition exist leaving the ram 156 in the forward position as the saws 104 and 105 are stroked, the side thrust coming on the ram 156 from the bracket 385 on the saw frame 114 contacting it ahead of the saws themselves, will cause the link 159 to move and immediately open the circuit to all motors, stopping them before any damage can occur to any part of the machine.

The electrical circuit controlling solenoid 386 of solenoid controlled switch 322 includes conductor 387, switch mechanism 388, and conductor 389. As previously described the link 159, which supports the ram 156 for swinging movement, is pivotally connected with a lever arm 390. One end portion of lever arm 390 is supported on fixed pivot 391 and a spring 392 connected with said lever arm 390 normally urges the switch 388 into electrically closed position. When switch 388 is in electrically closed position, solenoid controlled switch 322 is in electrically closed position, thereby providing energy for the operating motors and control mechanism. When switch 388 is open, solenoid controlled switch 322 is open and the supply of energy to the operating motors and control mechanism is interrupted.

Another safety feature is provided to prevent the energizing of the cam motor 279 in the event that either of the saw motors 112 or 113 is not rotating. A solenoid operated switch 393 has a switch closing solenoid 394 which is energized from conductors 321 and 320, which conductors, as previously explained, are normally only energized when saw motors 112 and 113 are energized. Energy from conductor 321 passes along conductor 399, through switch 397, along conductor 396, through solenoid 394, and along conductor 395 to conductor 320. Thus conductors 320 and 321 must be energized before the cam motor 279 may be energized.

For purpose of illustration, solenoid controlled switches 322, 339, 363, 368, 377, 324 and 325 have been illustrated and described as switches which are opened by gravity and closed by the energizing of their respective solenoids. However, it is to be understood that any conventional solenoid controlled switch may be obviously substituted in place of any solenoid controlled switch illustrated. In connection with electrical switches 341, 358, 339, 343, 384 and 388, I have illustrated the same with tension springs to keep such switches normally opened or closed according to the particular switch. I have not described the action of the springs as the same is obvious and the illustration is deemed sufficient.

The sequence of operation of the cam controlled parts of the machine is shown diagrammatically in Fig. 20. As indicated in this diagram, it has been found desirable to have the beginning and end of a cycle of operation of the machine, as predetermined by the final stop position of the clutch, occur immediately after the operation of the drawbar mechanism. At this time an incoming bundle will be in position on the drawbars 39 to be clamped, tied and have one end squarely trimmed. The previously dropped bundle will have been transferred to the rolls 131 into a suitable position to be clamped and to have the other end squarely trimmed. The bundle on the rolls 131, having passed over the trigger member 122, has set the desired depending stop bar 130. The pusher member 156 and the fingers 157 have been moved forward and the individual boards in the bundle of lumber resting on the rolls 131 have been each moved forward against the depending stop bar 130, so that the bundle on the lower level resting on rolls 131 is properly longitudinally positioned and ready for clamping and end trimming.

As the operator starts the cam shaft 47 rotating by the operation of switch 341, as discussed in connection with the wiring diagram, Fig. 32, the cycle of operation will commence. As previously pointed out, this cycle of operation cannot be commenced unless the bundle on the drawbars 39 has been positioned against and closes switch 339 and also it cannot be commenced unless the ram is forwardly positioned and has closed switch 346—347. Upon the starting of a cycle of operation the clamp rockshaft 67 is angularly moved, causing the clamps 60 and 219 to commence operation. At the end of the first 40° of the cycle of movement the clamps 60 have engaged and securely hold the bundle on the drawbars 39. At the same time the clamps 219 have engaged and securely hold the bundle on the rolls 131. The saw cam 103 commences to advance the saw frames 110 and 114 approximately 10° after the clamp cams commence to operate. The saw frames reach their peak of swinging movement at approximately 130° of the cycle and do not move far enough to saw the bundles on the two levels until after said bundles have been securely clamped. Connected to the clamp rockshaft 67 is the grade printing mechanism illustrated in Fig. 15, and the grade is marked on the side of the bundle resting on rolls 131 as the clamps 219 are being applied. As explained in connection with the pusher member 156 and the slide 171, the forward movement of the saw frames will release the catch 203 and permit the slide 171 together with the pusher member 156 to be retracted by the pull of the cable 214. The catch 203 releases the member 202 after the clamps have engaged the bundle on the rolls 131 and before the saw frames have been swingingly moved sufficient for the saws to commence sawing the bundles. After the saw cam 103 reaches its peak at approximately 130° of the cycle and as the saws are being returned between approximately 130° and 190° of the cycle, the end printing mechanism illustrated in Figs. 13 and 14 is operated and end marks the bundle in the upper as well as in the lower level.

After the saws have returned at approximately 190° of the cycle, the release of the clamps commences, which continues until approximately 230° of the cycle where the advanced stop is reached. It is to be noted in the operation of this device that if the switch 325, illustrated in the wiring diagram, Fig. 32, is opened before the advance stop is reached, that the machine will operate continuously for a complete cycle and will not stop at the advance stop. In the event that both the switch 341 and either of switches 358 have not been previously opened before the advanced stop is reached, the mechanism will stop at the advanced stop position, and upon the opening of both the switch 341 and either of switches 358, the machine will continue to operate for the remainder of the cycle, until the final stop position is reached. Between 230° of the cycle and approximately 260° of the cycle, the drawbar cam 46 will operate so that the bundle formerly resting on the drawbars 39 will be dropped and the drawbars 39 will be moved under and return another bundle into the machine. The kick-off cam 121 commences to operate at the same time as the drawbar cam 46 and ejects the finished bundle on the delivery side of the machine off of the rolls 131. As the bundle, which has been dropped from the drawbars 39 onto the belt 57 will take a short period of time before it reaches the rolls 131, the kick-off cam need not reach its peak as rapidly as the drawbar cam, and I have illustrated a drawbar cam reaching its peak at approximately 260° of the cycle, while the kick-off cam reaches its peak at approximately 272°. The bundle in the lower level on rolls 131 will depress the trigger switch member 122, and after passing thereover and releasing the same, set the proper stop bar 130 and forwardly extend pusher member 156 before the new cycle of operation may be commenced. Thereafter the machine continues for further cycles as just explained.

From the foregoing discussion it is to be noted that, a bundle of lumber must be in the proper position on the drawbars 39 and must close switch 339 before the clamping and trimming can take place. The saw motors must both be energized before any energy is furnished to the control circuits. Energy must be supplied to both saw motors 112 and 113 before the cam shaft motor 279 can be started, thus preventing the stroking of a non-rotating or dead saw should the clutch be left engaged. The bundle on the lower level must be properly positioned before the clutch can be operated. An operator can not start the stroking of the saws during the travel of the ram as the ram must be either in the fully retracted or fully advanced position to allow the operator to start the stroking of the saws. All motors will be de-energized in the event the ram remains in the forward position while the saws are being stroked. The trailing end of the bundle, by releasing the trigger member 122, selects the proper depending stop bar 130 in accordance with the length of the bundle. The bundle is clamped both vertically and horizontally at the time it is trimmed, thus insuring square trimming of the end portion of the bundle. The machine is synchronized to the tying operation and provides means for delaying the operation of the machine should the period of the tying operation vary. Means are provided for quickly disposing of a tied bundle, as by changing the level of said bundle, insuring utmost economizing of the time of the operators.

Obviously, changes may be made in the forms, dimensions and arrangement of the parts of my invention, without departing from the principle thereof, the above setting forth only preferred forms of embodiment.

I claim:

1. In a bundle trimming machine, a bundle supporting means moving a bundle transversely of the length of the bundle and into a trimming position; bundle clamping means securely clamping a bundle and holding said bundle immovable in said trimming position; movably mounted trimmer means movable in a plane transversely of the length of the bundle and operatively positioned as respects an end portion of said clamped bundle; clamp releasing means operable after the bundle has been trimmed; and means retracting the bundle supporting means permitting the bundle to be dropped and rapidly moved out of trimming position.

2. In a bundle trimming machine, a bundle pick-up and support reciprocably movable horizontally toward and away from a bundle trimming position; supporting devices positioning bundles to be picked up by said bundle pick-up and support; means moving the bundle support in one direction and a bundle thereon into a trimming position; bundle clamping means securely clamping a bundle in said trimming position; trimmer means operable as respects an end portion of said bundle; clamp releasing means operable after the bundle has been trimmed; and bundle support retracting means moving the bundle support in the other direction and withdrawing said bundle support from beneath the trimmed unclamped bundle.

3. In a random length bundle trimming machine, bundle moving means moving a bundle transversely into a trimming position; bundle trimmer means operatively positioned as respects one end portion of a bundle in said trimming position; transfer means operable after said bundle trimming means and moving a bundle longitudinally; a plurality of spaced apart movable stop members positioned in the path of the bundle, adapted when held to arrest the longitudinal movement of the bundle and adapted when not held to be deflected by the bundle; stop member holding means movable into and out of holding position relative to said stop members; control means, for said holding means, comprising a control member positioned in the longitudinal path of movement of the bundle and moving the holding means out of holding position when a bundle is passing thereby and moving the holding means to holding position after a bundle has passed thereby, whereby stop members in advance of the bundle will be held by the stop member holding means in response to actuation of said control means after the trailing end of the bundle has passed the control member; another bundle trimmer means; and devices operating said trimmer means to trim said trailing end portion of said bundle.

4. In a random length bundle trimming machine, bundle moving means moving a bundle transversely into a trimming position; bundle trimmer means operatively positioned as respects one end portion of a bundle in said trimming position; transfer means operable after said bundle trimming means and moving a bundle longitudinally; a plurality of pivotally mounted depending stop bars having their depending end portions positioned in the longitudinal path of movement of the bundle; stop means providing a plurality of members positioned to move across and out of the path of movement of the stop bars, thereby locking or releasing the stop bars respectively; control means for said stop means including a control member positioned in the longitudinal path of movement of the bundle, said control means positioning the stop means in releasing position when a bundle is passing the control member and positioning the stop means in locking position as the trailing end of a bundle passes the control member, whereby all depending stop members in the path of movement of the bundle will be released and deflected by the moving bundle until the trailing end of the bundle passes the control member and the next succeeding stop member, then in advance of the longitudinal moving bundle, will be locked; another bundle trimmer means; and devices operating said trimmer means to trim said trailing end portion of said bundle.

5. In a random length bundle trimming machine, bundle moving means moving a bundle transversely into a trimming position; bundle trimmer means operatively positioned as respects one end portion of a bundle in said trimming position; transfer means operable after said bundle trimming means and moving a bundle longitudinally; electrically controlled stop means operable in the longitudinal path of movement of the bundle; an electrical operating circuit for said electrically controlled stop means including an electrical switch; a control member for said electrical switch positioned in the path of movement of the bundle and operable to open or close said electrical switch in response to the presence or, whereby the stop means will be operated after absence of a bundle passing thereby the trailing end of the bundle passes the control member; another bundle trimmer means; and devices operating said trimmer means to trim said trailing end portion of said bundle.

6. In a bundle trimming machine, means supporting a bundle of pieces of lumber in a trimming position; bundle trimmer means operable to trim one end portion of said bundle; transfer means moving said bundle longitudinally to another trimming position; stop means positioned for engagement by the trimmed end of said bundle; pusher means movable into and out of the longitudinal path of movement of the bundle and when in said longitudinal path operatively positioned for engagement with the trailing end of said bundle, said pusher means embodying a plurality of resiliently supported fingers positioned for individual engagement with the several pieces of lumber in the bundle urging all of the pieces of lumber in the bundle against the stop means; and trimmer means operable to trim the trailing end portion of the bundle of lumber.

7. In a bundle trimming machine, transfer means moving a bundle of pieces of lumber longitudinally into a trimming position; stop means positioned for engagement by the foremost end of said bundle; pusher means movable into and out of the longitudinal path of movement of the bundle and when in said longitudinal path operatively positioned for engagement with the trailing end of said bundle, said pusher means embodying a plurality of resiliently supported fingers positioned for individual engagement with the several pieces of lumber in the bundle urging all of the pieces of lumber in the bundle against the stop means; trimmer means operable to trim the trailing end portion of the bundle of lumber; devices moving said pusher member into said position for engagement with a bundle; and retracting devices retracting the pusher means as the trimmer means advances to trim the bundle.

8. In a bundle trimming machine, means supporting a bundle of pieces of lumber in a trimming position; bundle trimmer means operable to trim one end portion of said bundle; transfer means moving said bundle longitudinally to another trimming position; a plurality of selectively operable spaced apart stop means operable in the longitudinal path of movement of the bundle; means, selectively operating said stop means, controlled by the length of the bundle; pusher means movable into and out of the longitudinal path of movement of the bundle and when in said longitudinal path operatively positioned for engagement with the trailing end of said bundle, said pusher means embodying a plurality of resiliently supported fingers positioned for individual engagement with the several pieces of lumber in the bundle urging all of the pieces of lumber in the bundle against one of the stop means; and trimmer means operable to trim the trailing end portion of the bundle of lumber.

9. In a bundle trimming machine, longitudinal bundle transfer means; stop means positioned in the longitudinal path of movement of the bundle against which an end of said bundle may be stopped; pusher means movable into and out of the longitudinal path of movement of the bundle and when in said longitudinal path operatively positioned for engagement with the other end of said bundle and adapted to urge said end of the bundle against said stop means; switch means controlled by the operation of the pusher means; trimmer means positioned to trim said other end of the bundle; electrically controlled devices operating said trimmer means; and an electrical operating circuit for said electrically controlled devices including a connection established by the operation of said switch means, whereby said electrically controlled devices can operate only after said pusher means has operated.

10. In a bundle trimming machine; two bundle supporting means positioned in longitudinally spaced relation and at different elevations and adapted to support a bundle on each with adjacent ends of the bundles longitudinally spaced apart a short distance, bundle transfer means positioned to receive bundles from the higher bundle supporting means and deliver the same to the lower bundle supporting means to a position where the bundles are supported with their adjacent ends longitudinally spaced a short distance apart; bundle clamping means operatively positioned to clamp each of said bundles; and two trimmer means operatively positioned to trim the longitudinally spaced apart adjacent ends of said bundles.

11. In a bundle trimming machine, transfer means longitudinally moving a bundle of pieces of lumber; a trigger member electrical switch operating means depressible by the bundle in its longitudinal travel and releasable as the trailing end of the bundle passes thereover; stop means positioned in the longitudinal path of movement of the bundle against which the advancing end of the bundle may be stopped; an electrically controlled pusher member, movable into and out of engagement with the trailing end portion of the bundle, and urging the advancing end of the bundle against said stop means; and an electrical circuit for said pusher member including therein electrical connection established by the operation of said trigger member electrical switch operating means.

12. In a bundle trimming machine, transfer means longitudinally moving a bundle of pieces of lumber; a trigger member electrical switch operating means positioned in the path of travel of the bundle; stop means positioned in the longitudinal path of movement of the bundle against which the advancing end of the bundle may be stopped; an electrically controlled pusher member, movable into and out of engagement with the trailing end portion of the bundle, and urging the advancing end of the bundle against said stop means; and an electrical circuit for said pusher member including therein electrical connection established by the operation of said trigger member electrical switch operating means.

13. In a bundle trimming machine, transfer means longitudinally moving a bundle of pieces of lumber; pusher member control means positioned in the path of travel of the bundle; stop means positioned in the longitudinal path of movement of the bundle against which the advancing end of the bundle may be stopped; and a pusher member operatively connected with said pusher member control means and movable into and out of the longitudinal path of travel of a bundle and when in said path operatively disposed to engage the trailing end of the bundle and to urge the advancing end of the bundle against said stop means.

14. In a combination tying and trimming machine, bundle supporting means supporting a bundle in tying and trimming position; withdrawing devices operatively connected with said bundle supporting means adapted to withdraw the supporting means and permit dropping of the bundle vertically; trimmer means operatively positioned to trim one end portion of said bundle; and spaced apart independently operable means for jointly controlling said withdrawing devices, whereby the operation of the withdrawing devices is under the joint control of the spaced apart control means to coordinate the tying and trimming operations.

15. In a bundle trimming machine, two bundle supporting means positioned in longitudinally spaced relation and at different elevations, and adapted to support a bundle on each with adjacent ends of the bundles longitudinally spaced apart a short distance; bundle transfer means positioned to receive bundles from the higher bundle supporting means and deliver the same to the lower bundle supporting means to a position where the bundles are supported with their adjacent ends longitudinally spaced a short distance apart; and trimmer means operatively positioned to trim the longitudinally spaced apart adjacent ends of said bundles.

16. In a bundle trimming machine, bundle moving means adapted to successively move bundles transversely into a trimming position; bundle trimmer means operatively positioned as respects one end portion of a bundle in said trimming position; retracting means for said bundle moving means operable to retract the bundle moving means and permit the bundle to drop out of trimming position; transfer means receiving said bundle and transferring the same longitudinally; and other trimmer means trimming the remaining end of such a bundle.

17. In a bundle trimming machine, bundle moving means adapted to successively move bundles transversely into a trimming position; bundle trimmer means operatively positioned as respects one end portion of a bundle in said trimming position; retracting means for said bundle moving means operable to retract the bundle moving means and permit the bundle to drop out of trimming position; transfer means receiving said bundle and transferring the same longitudinally; and other trimmer means trimming the remaining end of such a bundle and adapted to operate simultaneously with the first mentioned trimmer means and as the first mentioned trimmer means is trimming one end portion of a succeeding bundle.

18. In a bundle trimming machine, bundle moving means moving the bundle transversely into a trimming position; bundle trimmer means operatively positioned as respects one end portion of a bundle in said trimming position; retracting means for said bundle moving means operable to retract said bundle moving means and permit the bundle to drop out of trimming position; transfer means receiving said bundle and transferring the same in a longitudinal direction and towards the trimmer means with the trimmed end of the bundle in advance; stop means positioned to engage with the trimmed end of said bundle; and other trimmer means operatively positioned as respects the untrimmed end of said bundle when the trimmed end of said bundle rests against said stop means.

19. In a random length bundle trimming machine, bundle moving means moving a bundle transversely into a trimming position; bundle trimmer means operatively positioned as respects one end portion of a bundle in said trimming position; transfer means receiving said trimmed bundle and moving said bundle longitudinally; a plurality of longitudinally spaced apart stop members movable out of and into bundle stopping position and normally in bundle stopping position, said stop members being positioned in the longitudinal path of movement of the bundle; stop member control means controlling the operation of said stop members and operatively positioned in the longitudinal path of travel of the bundle and in advance of the stop members as respects said path of travel, said control means being responsive to a bundle passing thereby to move the stop members out of normal bundle stopping position; another bundle trimming means; and devices operating said trimming means to trim said trailing end portion of said bundle.

20. In a random length bundle trimming machine, transfer means moving a bundle longitudinally; a plurality of longitudinally spaced apart stop members movable out of and into bundle stopping position and normally in bundle stopping position, said stop members being positioned in the longitudinal path of movement of the bundle; and stop member control means controlling the operation of said stop members and operatively positioned in the longitudinal path of travel of the bundle and in advance of the stop members as respects said path of travel, said control means being responsive to a bundle passing thereby to move the stop members out of normal bundle stopping position.

21. In a combination bundle tying and trimming machine, bundle supporting means supporting a bundle in a position for simultaneous tying and end trimming; trimmer means operatively positioned to trim one end portion of said bundle; retracting means for said bundle supporting means operable to retract the bundle supporting means and permit the bundle to drop out of trimming and tying position; and spaced apart independently operable means for jointly operating said retracting means, whereby the operation of the bundle moving means is under the joint control of spaced apart control means.

EMMETT G. CLEVELAND.